US012580320B2

(12) United States Patent
Li

(10) Patent No.: US 12,580,320 B2
(45) Date of Patent: Mar. 17, 2026

(54) MOBILE TERMINAL

(71) Applicant: BEIJING XIAOMI MOBILE SOFTWARE CO., LTD., Beijing (CN)

(72) Inventor: Yueliang Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 216 days.

(21) Appl. No.: 18/374,654

(22) Filed: Sep. 28, 2023

(65) Prior Publication Data

US 2025/0233313 A1 Jul. 17, 2025

(30) Foreign Application Priority Data

May 17, 2023 (CN) ......................... 202310560965.5

(51) Int. Cl.
*H01Q 13/18* (2006.01)
*H01Q 1/22* (2006.01)
*H01Q 1/24* (2006.01)

(52) U.S. Cl.
CPC ........... *H01Q 13/18* (2013.01); *H01Q 1/2291* (2013.01); *H01Q 1/241* (2013.01)

(58) Field of Classification Search
CPC ...... H01Q 1/22; H01Q 1/2266; H01Q 1/2291; H01Q 1/24; H01Q 1/241; H01Q 1/243; H01Q 1/36; H01Q 1/52; H01Q 9/04; H01Q 9/0421; H01Q 9/42; H01Q 13/18; H01Q 21/28
See application file for complete search history.

(56) References Cited

U.S. PATENT DOCUMENTS

2016/0141767 A1* 5/2016 Zhai ......................... H01Q 1/38 343/893
2021/0135351 A1* 5/2021 Son ......................... H01Q 5/328
2021/0367326 A1* 11/2021 Chen ......................... H01Q 1/38
2023/0093645 A1* 3/2023 Yang ......................... H01Q 21/30
2023/0352854 A1* 11/2023 Wu ......................... H01Q 7/00
2024/0021982 A1* 1/2024 Wu ......................... H01Q 1/36

OTHER PUBLICATIONS

Extended European Search Report issued in Application No. 23207406.2 dated Apr. 24, 2024, (9p).

* cited by examiner

*Primary Examiner* — Thai Pham
(74) *Attorney, Agent, or Firm* — Arch & Lake LLP

(57) ABSTRACT

The present disclosure relates to the field of electronic device technology, and specifically provides a mobile terminal including a housing and an antenna system. The antenna system includes a first low-frequency antenna and a second low-frequency antenna respectively provided close to two opposite sides of the housing, and at least one of the first low-frequency antenna and the second low-frequency antenna is a cavity antenna.

20 Claims, 11 Drawing Sheets

MOBILE TERMINAL

CROSS-REFERENCE TO RELATED APPLICATION

The present disclosure is based upon and claims the priority to Chinese Patent Application No. 202310560965.5, filed on May 17, 2023, the contents of which are incorporated herein by reference in their entireties for all purposes.

BACKGROUND

With the development of electronic device technology, mobile terminals can now achieve more and more functions, such as satellite positioning, wireless internet access, making and receiving calls, mobile payments, etc. These functions rely on wireless communication technology. Therefore, antenna design for wireless communication has always been a key research direction for mobile terminals.

SUMMARY

The present disclosure relates to the field of electronic device technology, and in particular, to a mobile terminal, the antenna performance of which is improved.

According to a first aspect, embodiments of the present disclosure provide a mobile terminal including: a housing; and an antenna system including a first low-frequency antenna and a second low-frequency antenna respectively provided close to two opposite sides of the housing, wherein at least one of the first low-frequency antenna and the second low-frequency antenna is a cavity antenna.

According to a second aspect, embodiments of the present disclosure provide a tablet personal computer including: a housing; and an antenna system including a first low-frequency antenna and a second low-frequency antenna respectively provided close to two opposite sides of the housing, wherein at least one of the first low-frequency antenna and the second low-frequency antenna is a cavity antenna.

BRIEF DESCRIPTION OF THE DRAWINGS

In order to more clearly illustrate the technical solutions in the specific embodiments or prior art of the present disclosure, the accompanying drawings to be used in the description of the specific embodiments or prior art will be briefly described below. It will be apparent that the accompanying drawings in the following description are some of the embodiments of the present disclosure, and other accompanying drawings may be obtained from these drawings without creative labor for those of ordinary skill in the art.

DETAILED DESCRIPTION

Figure 1:
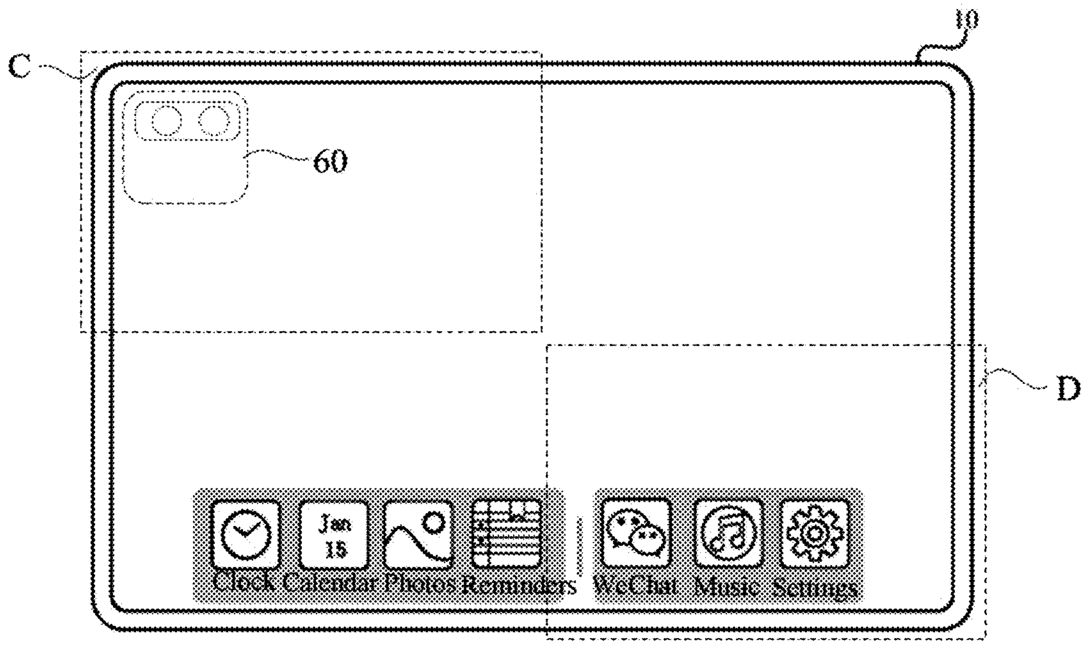
FIG. 1 is a schematic diagram of a mobile terminal according to some embodiments of the present disclosure.

The technical embodiments of the present disclosure will be clearly and completely described below in conjunction with the accompanying drawings. It is apparent that the described embodiments are part of the embodiments of the present disclosure and not all of them. Based on the embodiments in the present disclosure, all other embodiments obtained by a person of ordinary skill in the art without creative labor fall within the scope of protection of the present disclosure. In addition, the technical features involved in the different embodiments of the present disclosure described below may be combined with each other as long as they do not conflict with each other.

Nowadays, with the development of wireless communication technology, more and more wireless communication antennas are included in mobile terminals, such as Global Positioning System (GPS) antennas for satellite positioning, wireless fidelity (Wi-Fi) antennas for wireless local area networks, 4G Long Term Evolution (LTE) antennas and 5G antennas for cellular networks, Bluetooth® (BT) antenna for Bluetooth connection. In addition, some mobile terminals also include Ultra Wide Band (UWB) antennas, Near Field Communication (NFC) antennas, etc.

It can be seen that there are a large number of antennas included in mobile terminals. However, at present, mobile terminals are gradually developing towards integration and thinness, and the internal space of mobile terminals is very compact, which brings challenges for antenna design. Moreover, with people's pursuit of the appearance design of mobile terminals, the integrated metal body has become the standard for most high-end products due to its better visual effects and structural strength. However, the metal housing or metal shell has a shielding effect on the antenna signal, which further brings difficulties for the antenna design of mobile terminals.

In related art, a metal frame is usually broken by opening a slit or setting a broken seam in a metal body of a mobile terminal, and various antennas are formed by using the metal of the body as an antenna radiator. However, this method requires the metal body to be broken and seamed, and then to be filled with non-metallic materials. Due to the large number of antennas, many broken seams need to be set on the metal body, which greatly affects the appearance and structural strength of the product. In addition, this antenna structure is greatly affected by the metal of the body, which results in poor antenna performance, especially when the user holds the body, and the antenna performance attenuation is more serious.

Based on the above-mentioned defects in related art, the present disclosure provides a mobile terminal, aiming to optimize the antenna design of the mobile terminal and improve the antenna performance of the mobile terminal. The mobile terminal described in this disclosure can be any type of terminal suitable for implementation, such as a tablet personal computer, a cell phone or mobile phone, a handheld game console, a personal digital assistant (PDA), etc., and the present disclosure is not limited thereto.

For example, FIG. 1 shows a schematic diagram of a structure of a mobile terminal of the present disclosure. In the example of FIG. 1, the mobile terminal is illustrated as a tablet personal computer 10.

As shown in FIG. 1, the tablet personal computer 10 has a structure in rectangular shape, which includes two parallel long sides and two parallel short sides. Therefore, the tablet personal computer 10 is generally available in both landscape mode and portrait mode, and accordingly, the device manufacturers of the tablet personal computer 10 also guide and optimize the landscape mode and portrait mode.

Therefore, in the embodiments of the present disclosure, different areas of the mobile terminal can be divided according to the different antenna clearance environments in the user's usage scenarios in combination with the actual usage scenarios of the mobile terminal.

Figure 2:
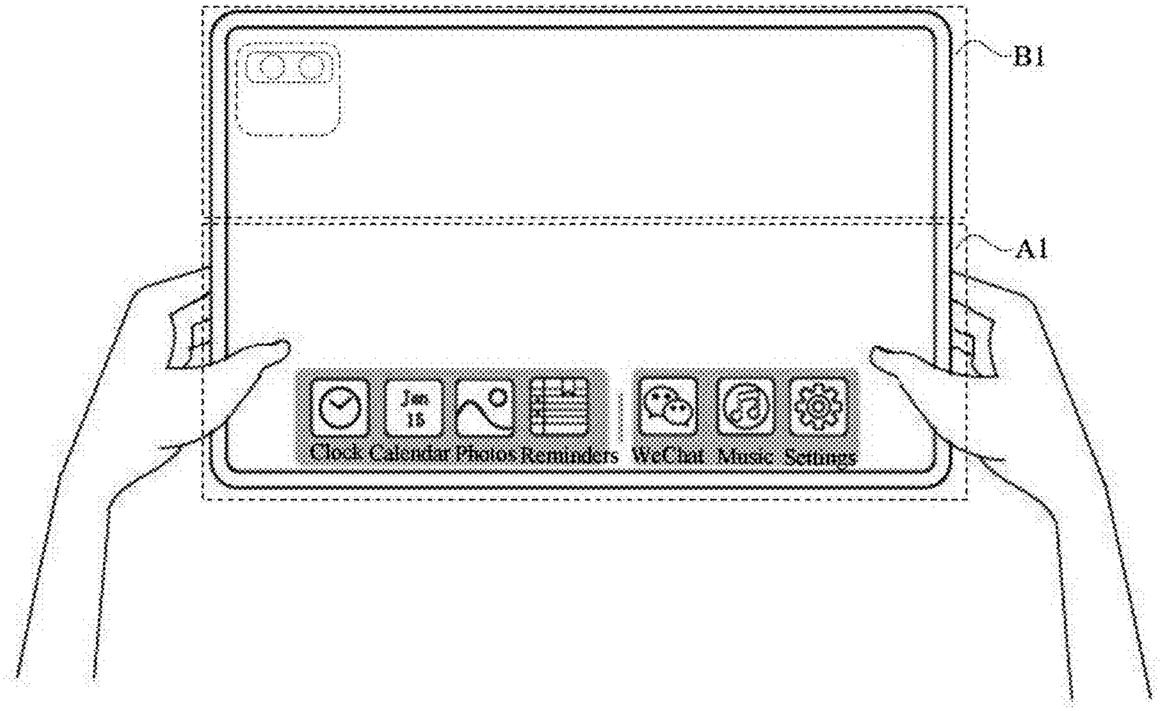
FIG. 2 is a schematic diagram of a usage scenario of a mobile terminal according to some embodiments of the present disclosure.

In an example shown in FIG. 2, in a scenario where the tablet personal computer 10 is used in the landscape mode, the user's hands generally hold the lower part of the tablet personal computer 10. Therefore, in the scenario of using the landscape mode, the lower area of the tablet personal computer 10 can be defined as "landscape holding area A1" and the upper area of the tablet personal computer 10 can be defined as "landscape non-holding area B1" in the present disclosure.

Figure 3:
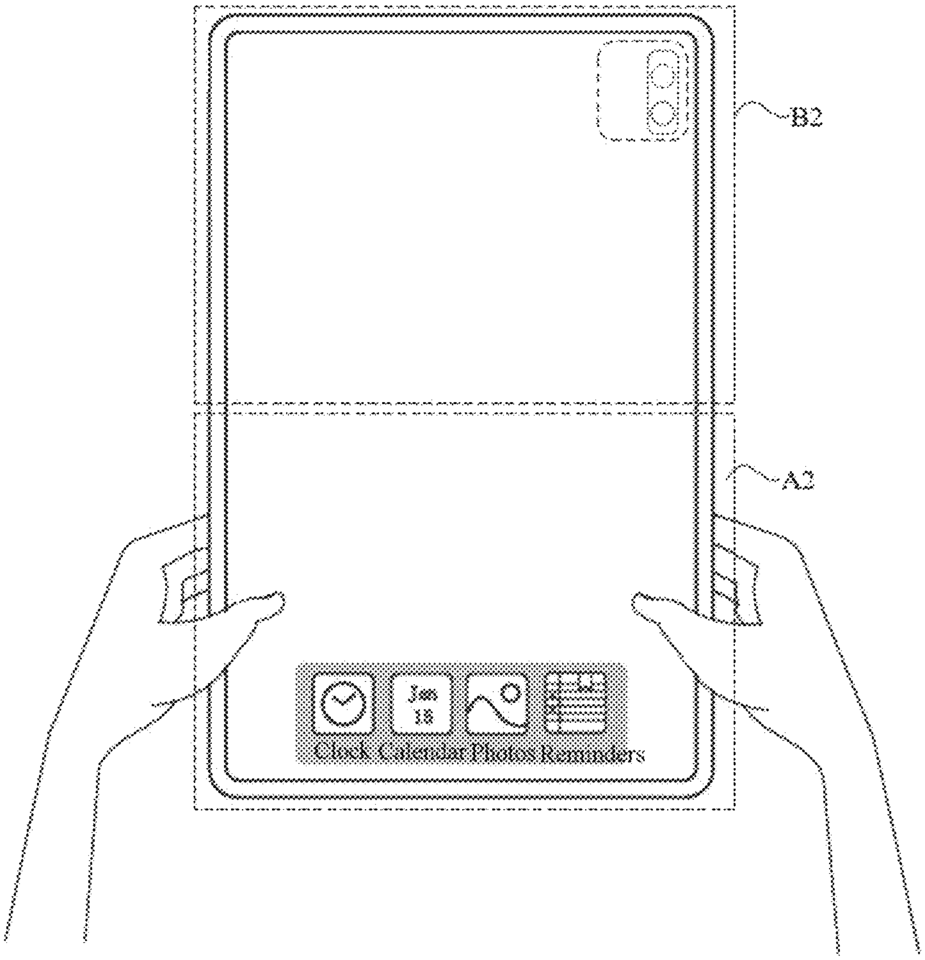
FIG. 3 is a schematic diagram of a usage scenario of a mobile terminal according to some embodiments of the present disclosure.

In another example shown in FIG. 3, in a scenario where the tablet personal computer 10 is used in the portrait mode, the user's hands hold the lower part of the tablet personal computer 10. Therefore, in the scenario of using the portrait mode, the lower area of the tablet personal computer 10 can be defined as "portrait holding area A2" and the upper area of the tablet personal computer 10 can be defined as "portrait non-holding area B2" in the present disclosure.

Based on the scenarios shown in FIGS. 2 and 3, it can be seen that regardless of whether the tablet personal computer 10 is used in landscape or portrait orientation, there is a part of the tablet personal computer 10 that the user can't hold, and due to the influence of the human body on the antenna radiation performance, the antenna clearance environment of the user's holding area is much worse than that of the non-holding area. Therefore, the antenna of the terminal should be prioritized to be installed in the non-holding area.

For example, in the scenario shown in FIG. 2, the antenna clearance environment in the landscape non-holding area B1 is better than that in the landscape holding area A1, while in the scenario shown in FIG. 3, the antenna clearance environment in the portrait non-holding area B2 is better than that in the portrait holding area A2. In the embodiments of the present disclosure, since the landscape non-holding area B1 is along the long side of the mobile terminal, the antenna clearance area corresponding to the landscape non-holding area B1 can be defined as the "long-side antenna clearance area B1". Similarly, since the portrait non-holding area B2 is along the short side of the mobile terminal, the antenna clearance area corresponding to the portrait non-holding area B2 can be defined as "short-side antenna clearance area B2".

Therefore, in the embodiments of the present disclosure, different antenna clearance areas of the mobile terminal can be defined according to the advantages and disadvantages of the antenna clearance environment. For example, in some embodiments, the first clearance area described in this disclosure can include the aforementioned long-side antenna clearance area B1 and short-side antenna clearance area B2, while the remaining areas can be defined as the second clearance areas. In combination with the usage scenario of FIGS. 2 and 3, it can be seen that the antenna clearance environment of the first clearance area is significantly better than that of the second clearance area.

In addition, it is necessary to point out that, as can be seen from FIG. 2 and FIG. 3, there is always a part of the first clearance area that cannot be held by the user no matter in landscape or portrait mode, i.e., the overlapping area between the long-side antenna clearance area B1 and the short-side antenna clearance area B2, and this overlapping area is the area C shown in FIG. 1. Since the user can hardly, even cannot, hold the overlapping area C during use, the overlapping area C is the optimal area for antenna design in the first clearance area. In the embodiments of the present disclosure, the overlapping area in the first clearance area can be defined as "target clearance area C".

Figure 4:
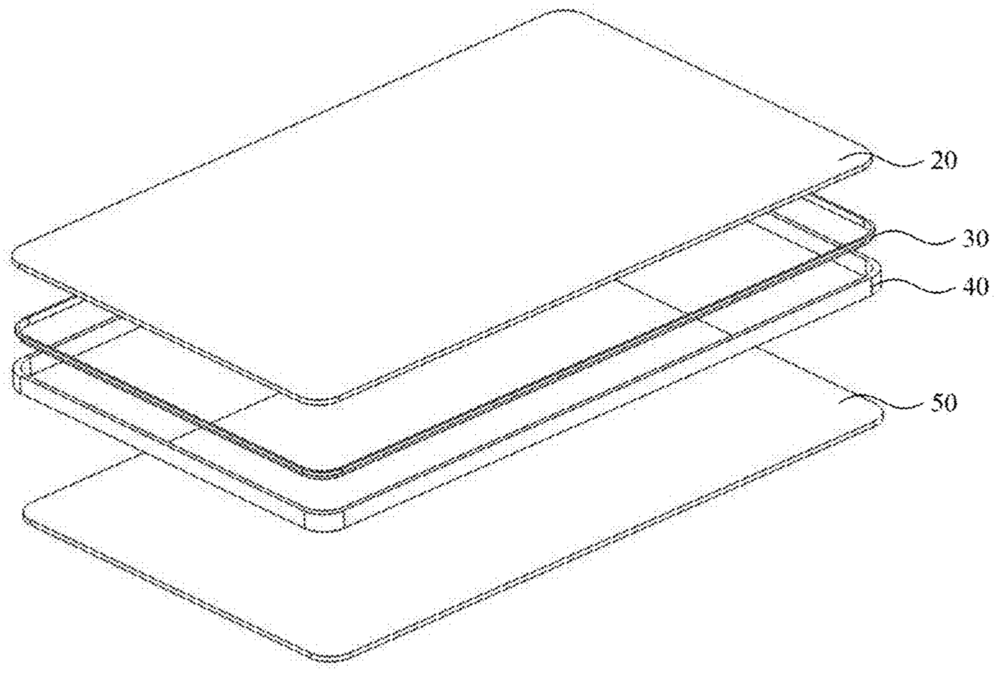
FIG. 4 is an explosive view of a mobile terminal according to some embodiments of the present disclosure.

The usage scenarios of the mobile terminal and some definitions of terms of the present disclosure are described above in conjunction with FIGS. 1 to 3. FIG. 4 shows an exploded view of a housing of a mobile terminal in the related art, and the principle of the mobile terminal is explained below in conjunction with FIG. 4.

In the example of FIG. 4, the mobile terminal is still illustrated as the tablet personal computer 10 as shown in FIG. 1, and the housing of the tablet personal computer 10 mainly includes a screen component 20, a support body 30, a frame 40 (or bezel 40), and a backplane 50.

The screen component 20 is a display module of the tablet personal computer 10, which serves directly as the front of the appearance of the tablet personal computer 10. The frame 40 refers to the side frame of the tablet personal computer 10, which may be made of metal, alloy or plastic, and the upper end surface of the frame 40 is fixedly assembled with the screen component 20 through the support body 30. The support body 30 refers to a bearing structure used to carry the screen component 20 as well as other electrical components, and it is generally a plastic bracket. The lower end surface of the frame 40 is fixedly assembled with the backplane 50, which can be or serve as the back of the appearance of the tablet personal computer 10, and the backplane 50 can generally be metal, alloy, plastic or leather material. Of course, the internal part of the tablet personal computer 10 can include other electrical components, such as a battery, a motherboard, a sensor, etc., which will not be detailed in the present disclosure.

In traditional antenna design schemes, non-metallic materials such as glass, plastic, and leather are generally used for the backplane 50, so that the non-metallic backplane 50 will not affect the antenna inside the terminal, and the design of the antenna can be easily achieved by using traditional Flexible Printed Circuit (FPC) antennas, Laser-Direct-structuring (LDS) antennas, or metal frame antennas.

However, with people's pursuit of the appearance of mobile terminals, more and more mobile terminals adopt all-metal integrated-formed housings (i.e., all-metal Unibody housings), that is, the frame 40 and backplane 50 in FIG. 4 are integrally molded in metal. However, the antenna design of the mobile terminal with all-metal housing is doubly difficult because the metal backplane 50 has a great influence on the antenna performance inside the body.

For mobile terminals such as tablet personal computers, the essential basic wireless communication capabilities include Wi-Fi, Bluetooth®, satellite positioning, and in order to realize cellular network communication, one or more cellular network antennas need to be further included. The communication frequency bands supported by mobile terminals are described below.

LB frequency band or LB band, i.e., a low-frequency band, with a frequency range of 700 MHz~960 MHz, mainly includes Band 5 (B5), B8, B12, B17, B20, and B28 of the Long Term Evolution (LTE) standard; GSM850 and GSM900 of the Global System for Mobile Communications (GSM) standard; CDMA0, WCDMA5, and WDMA8 of the Code Division Multiple Access (CDMA) standard; and N28 frequency band or N28 band of the 5th Generation Mobile Communication Technology (5G) standard.

MHB frequency band or MHB band, i.e., medium-to-high frequency band, with a frequency range of 1710 MHz~2690 MHz, mainly includes B1, B3, B4, B7, B34, B38, B39, B40, and B41 of the LTE standard; GSM1800 and GSM1900 of the GSM standard; WCDMA1, WDMA2, WCDMA3, and WDMA4 of the CDMA standard; and N1, N3, N7, N38, and N41 frequency bands of the 5G standard.

HB frequency band or HB band, i.e., high-frequency band, mainly includes N77 band with a frequency range of 3.3 GHZ~4.2 GHz, and N78 band with a frequency range of 3.3 GHZ~3.8 GHz of the 5G standard.

GPS frequency band or GPS band includes L1 and L5 bands. The center operating frequency of L1 band is 1.575 GHz, and the center operating frequency of L5 band is 1.176 GHz. Single-band GPS can only support L1 band, while dual-band GPS needs to support both L1 and L5 bands.

Wi-Fi frequency band includes 2.4G band and 5G band. The frequency range of 2.4G band is 2.402 GHz~2.48 GHz, and the frequency range of 5G band is 5.15 GHZ~5.85 GHz. Single-band Wi-Fi only supports 2.4G band, while dual-band Wi-Fi needs to support both 2.4G and 5G bands.

The mobile terminal of the present disclosure can implement an antenna design that includes the aforementioned frequency bands, which will be described below.

In some embodiments, the mobile terminal of the present disclosure includes a housing, a screen component, and an antenna system.

The housing refers to a shell structure of the mobile terminal, and in some embodiments, the housing may include a backplane and a frame. The frame refers to a frame structure enclosed by four sides, used as a side structure of the mobile terminal. For example, since the mobile terminal is mostly a rectangular structure, its frame can be formed by enclosing two long and two short sides to form a rectangular side frame (or a rectangular border). The backplane is fixedly connected to one end surface of the frame, thereby forming a shell structure with an opening on one side. The electrical components of the mobile terminal can be installed inside the shell structure, such as a motherboard, battery, sensor, vibration motor, etc.

Figure 5:
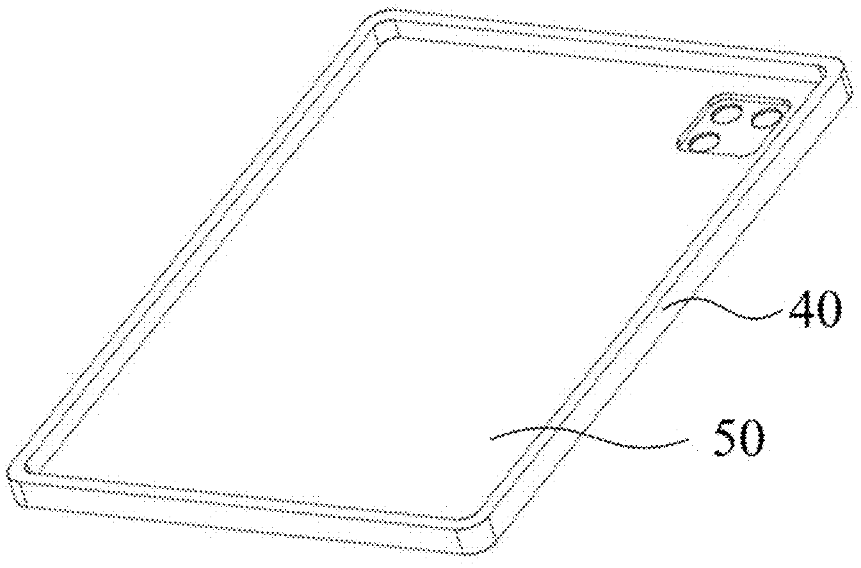
FIG. 5 is a schematic diagram of a housing of a mobile terminal according to some embodiments of the present disclosure.

In some embodiments of the present disclosure, the housing may adopt an all-metal integrated-formed (Unibody) body, i.e., the backplane and the frame of the housing are integrally molded with the same metal material. Taking a tablet personal computer as an example for the mobile terminal, FIG. 5 shows the shell structure of the mobile terminal. As shown in FIG. 5, the housing adopts an all-metal Unibody body, i.e., the backplane 50 and the metal frame 40 are integrally molded in metal, thereby forming an all-metal Unibody body to improve the appearance and texture of the product.

In some embodiments of the present disclosure, the screen component includes a cover plate and a display panel in a stacked arrangement, and the cover plate has a larger coverage area than that of the display panel, such that the screen component is assembled to the open end of the housing by the edge of the cover plate.

Figure 6:
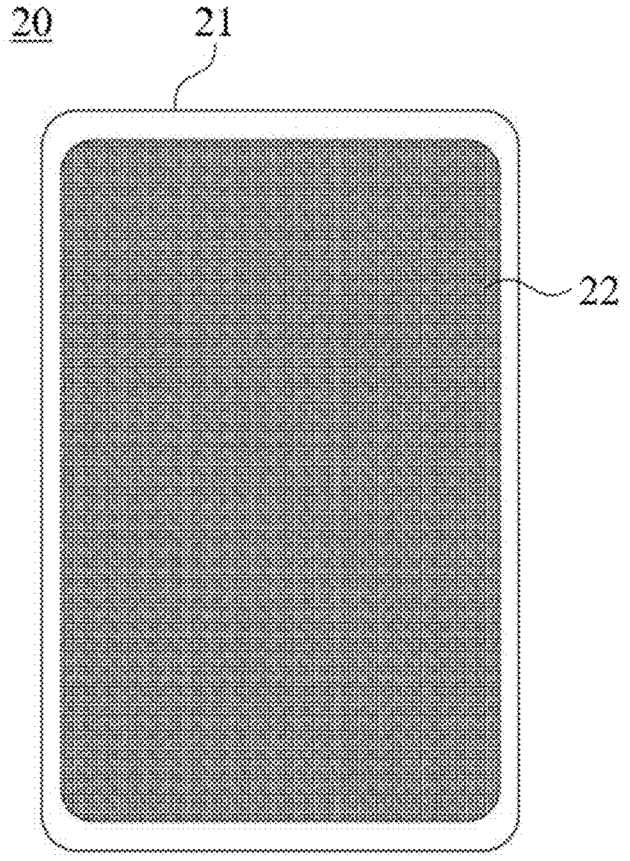
FIG. 6 is a schematic diagram of a structure of a screen component of a mobile terminal according to some embodiments of the present disclosure.

For example, FIG. 6 shows a main view of the screen component 20 in some embodiments of the present disclosure. As shown in FIG. 6, the screen component 20 includes a cover plate 21 and a display panel 22 in a stacked arrangement. The display panel 22 refers to the module of the screen component 20 used to display images, which may include a touch layer, a light-emitting layer, indium tin oxide (IoT), etc., that are used to achieve functions such as image display and touch interaction. The cover plate 21 is a protective structure covering the outermost layer of the display panel 22, which is generally made of glass.

The area of the cover plate 21 is generally larger than the area of the display panel 22, due to the fact that the cover plate 21 is required to serve as a structure for the assembly of the screen component 20 with other parts. For example, as shown in FIG. 6, the area of the display panel 22 can be used to display the screen, while the extra area of the cover plate 21 compared to the display panel 22 cannot be used to display the screen, which forms a "black border" commonly referred to in the field of electronic devices. In other words, the width of the black border of the screen component 20 is equal to the difference between the width of the cover plate 21 minus the width of display panel 22.

Figure 7:
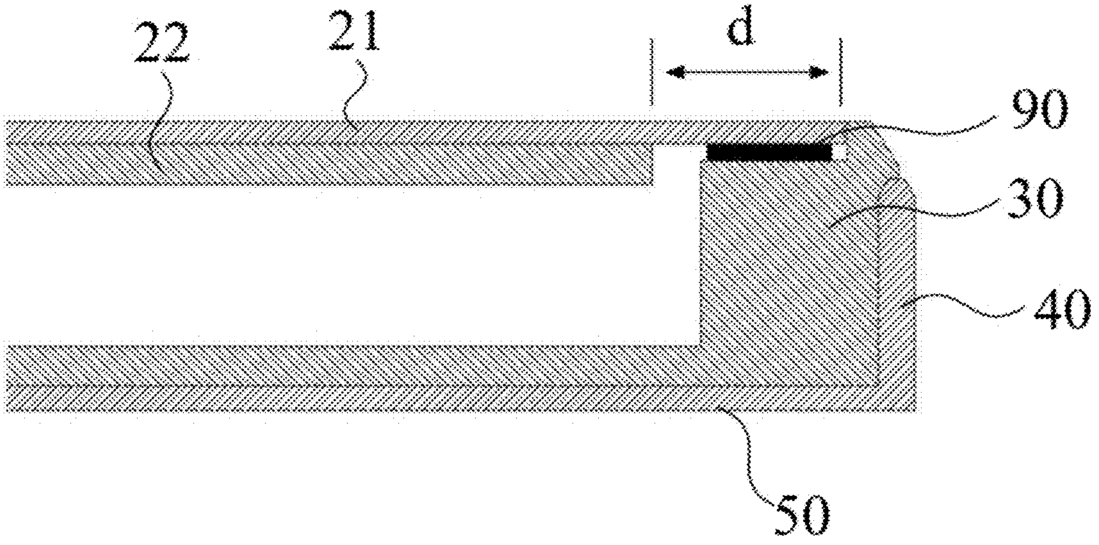
FIG. 7 is a cross-sectional view of an assembly of a mobile terminal according to some embodiments of the present disclosure.

FIG. 7 shows a schematic diagram of a cross-sectional structure of a mobile terminal in some embodiments of the present disclosure. In the example of FIG. 7, the housing includes a frame 40 and a backplane 50 formed in an all-metal Unibody. A screen component 20 is assembled and connected to the housing through a support body 30, which can be a plastic bracket structure.

The screen component 20 includes a cover plate 21 and a display panel 22, and is fixedly assembled with the support body 30 through the cover plate 21. As can be seen in FIG. 7, the area of the cover plate 21 is larger than the area of the display panel 22, and therefore, for one side of the screen component 20, there is a black border with width d in which images cannot be displayed. In other words, the black border has a weak shielding effect on the antenna signals because no screen alignment will be arranged in the black border. Accordingly, in the embodiments of the present disclosure, the black border can be used to layout the antenna system, thereby realizing the antenna design for the mobile terminal with all-metal housing.

In some embodiments of the present disclosure, there are two methods of using the black border of the screen component 20 to implement the antenna design.

In one method, a radiator of an antenna can be provided on a connection surface between the cover plate 21 and the support body 30. For example, as shown in FIG. 7, the antenna radiator 90 is applicable to an FPC antenna or an LDS antenna, etc., so that the radiator 90 can be arranged on the connection surface between the support body 30 and the cover plate 21 of the screen component 20. For conventional tablet personal computers, the width d of the black border is generally above 7 mm, which can fully satisfy the spatial requirements of the antenna radiator.

In another method, a cavity antenna can be provided inside the housing close to the black border. The cavity antenna is an antenna structure that utilizes a metal cavity to generate electromagnetic radiation. The cavity antenna has the advantages of directional radiation, high stability, high sensitivity, and strong anti-electromagnetic interference capability. By providing the cavity antenna close to the black border, the antenna radiation performance can fully meet the design requirements of the mobile terminal.

In order to facilitate the understanding of the present disclosure, the structure and working principle of the cavity antenna involved in the embodiments of the present disclosure are firstly described below.

Figure 8:
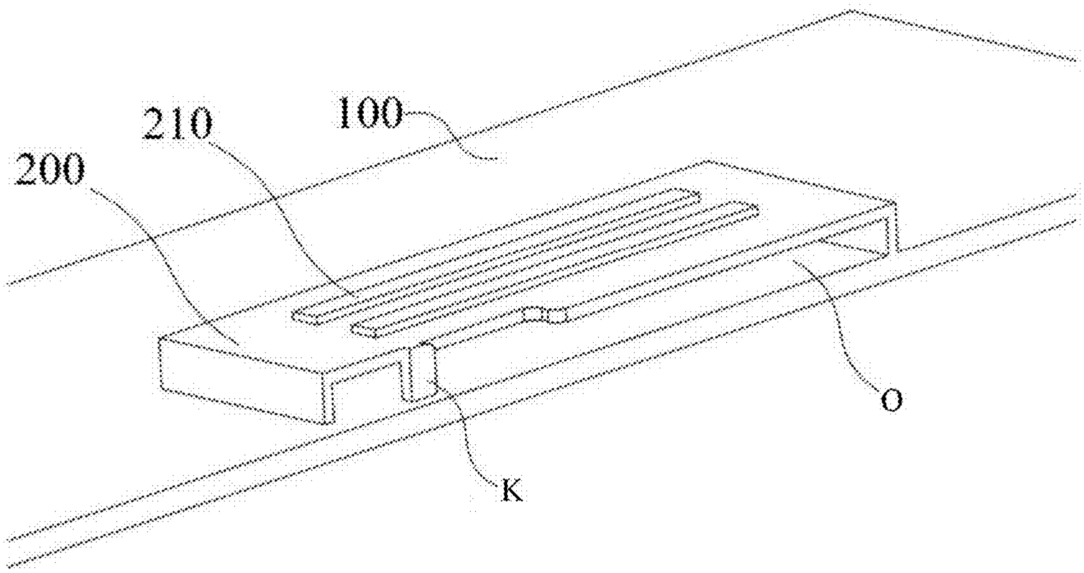
FIG. 8 is a schematic diagram of a structure of a cavity antenna of a mobile terminal according to some embodiments of the present disclosure.

As shown in FIG. 8, the cavity antenna includes a circuit board 100 and a cavity plate 200 made of conductor material. The circuit board 100 includes a ground plane (GND) of the antenna system, and the circuit board may be, for example, a Printed Circuit Board (PCB), which serves as a zero potential plane, also called a reference GND, of the antenna system.

The cavity plate 200 is made of metal and has an overall cover structure, and the cavity plate 200 is snap-fitted and connected to the circuit board 100 to form the cavity structure. In some embodiments, the cavity plate 200 may be connected to the circuit board by a surface mounted technology (SMT) of welding procedure.

The cavity structure, formed by welding the cavity plate 200 to the circuit board 100, has an open end (or an opening) on at least one side. In the example of FIG. 8, an open end or opening O is provided on one side of the cavity structure, and the direction of the opening O is the main radiation direction of the cavity antenna. Therefore, in the cavity antenna described below in the present disclosure, the open end of the antenna can be provided close to the above-mentioned black border, so as to increase the radiation and reception capability of the cavity antenna in the black border, and thus improve the performance of the antenna.

Continuing to refer to FIG. 8, the cavity antenna, in order to realize the excitation of the resonant frequency of the antenna, needs to be provided with a feeder terminal at the opening O. One end of the feeder terminal is connected to the cavity plate 200 at the position of the open end, and the other end of the feeder terminal is connected to a radio frequency circuit (not shown) on the circuit board 100. The radio frequency circuit refers to the radio frequency excitation source of the antenna system, which feeds the cavity plate 200 to realize the radiation and reception of the antenna signal. The radio frequency circuit can be, for example, a radio frequency integrated circuit (IC) chip, which can be understood and fully realized by the those skilled in the art with reference to the relevant technology, and will not be detailed in the present disclosure.

In some embodiments of the present disclosure, as shown in FIG. 8, since the cavity antenna has a hollow structure inside, the cavity structure is prone to be bent or damaged by extrusion during the assembly process of the mobile terminal, which may affect the performance of the antenna.

In this regard, in some embodiments of the present disclosure, a feeder terminal K may be provided as a rigid structure, so that the feeder terminal K may serve as a structural support for the opening O to improve the structural strength of the cavity antenna. In some other embodiments, as shown in FIG. 8, the cavity plate 200 may be further provided with concave-convex reinforcing rib strips 210, which can improve the structural strength of the cavity plate 200, improve the deformation resistance of the cavity plate 200, and thus further ensure the structural strength of the cavity antenna.

In some embodiments, for a mobile terminal with an all-metal housing, since the metal housing itself is a large conductor plate, the housing can be connected to the reference GND of the circuit board 100, i.e., the housing and the circuit board together serve as the reference GND of the antenna system.

Figure 9:
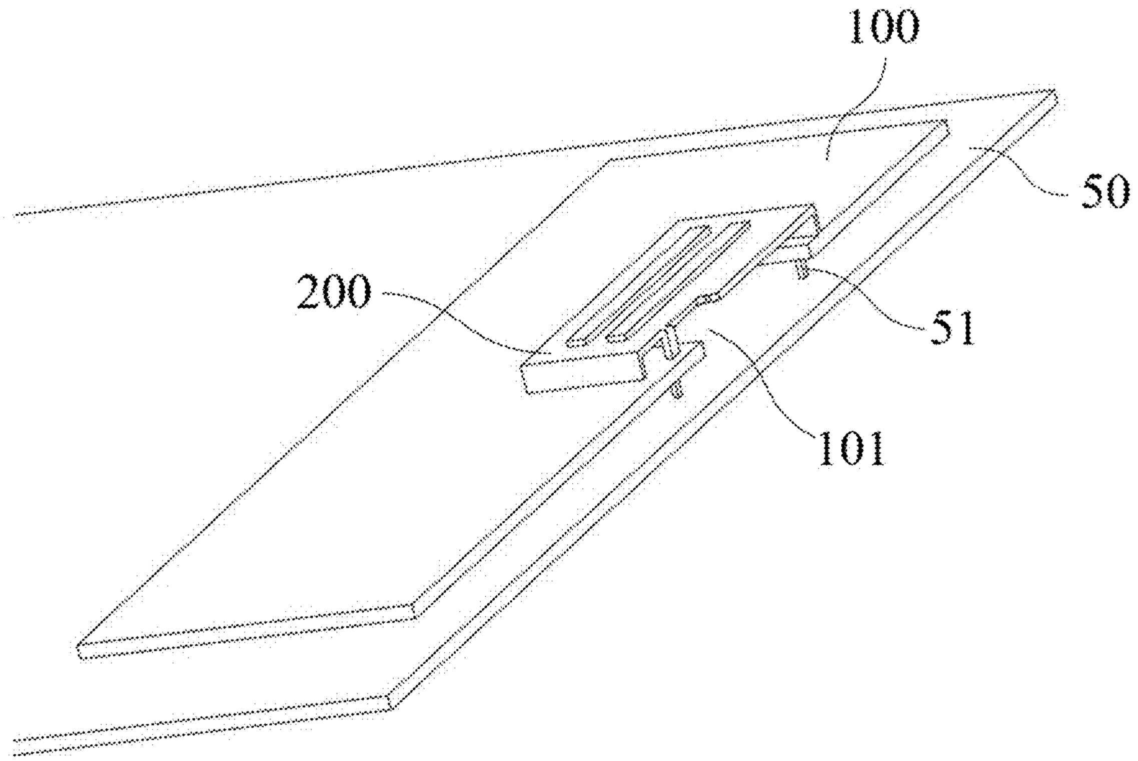
FIG. 9 is a schematic diagram of a structure of a cavity antenna of a mobile terminal according to some embodiments of the present disclosure.

In the example of FIG. 9, an electrical connection may be established between the circuit board 100 and the backplane 50 on the side of the circuit board 100 away from the cavity plate 200. For example, a connection structure 51, such as a metal spring or a spring pin, may be provided on the back side of the circuit board 100, through which a stable electrical connection with the backplane 50 is established.

Continuing to refer to FIG. 9, since the PCB laminated structure of the circuit board 100 includes multiple layers of metallic materials and non-metallic media, and these non-metallic media will affect the radiation performance of the cavity antenna, in the case of using the backplane 50 for grounding, the circuit board inside the cavity structure can be hollowed out, i.e., a penetration groove 101 or a groove 101 is formed at the position of the circuit board 100 inside the cavity structure. Due to the existence of the groove 101, the part of the circuit board 100 at the position in the cavity structure is stripped and hollowed out, so that the non-metallic media which has a great influence on the radiation performance of the antenna is removed, the transmission medium is turned into air, and the radiation loss is reduced, thus improving the performance of the antenna.

In the examples of FIGS. 8 and 9, the cavity structure is formed by the cavity plate 200 and the circuit board 100 in the cavity antenna, while in other embodiments, the cavity structure may be formed by the cavity plate 200 and the backplane 50 made of conductor material. For example, in some embodiments, with reference to FIG. 9, the cavity plate 200 may be snap-fitted and connected to the backplane 50 so that an inner wall of the cavity plate 200 and the surface of the backplane 50 form a cavity structure. It can be understood that under this structure, the radiation performance of the cavity antenna directly on the metal backplane 50 will be better because there is no influence of the laminated structure of the circuit board 100 in the cavity structure.

The structure of the cavity antenna of the present disclosure is described above, and in the embodiments of the present disclosure, the cavity antenna can be fused a plurality of resonant frequency bands, that is, the plurality of resonant frequency bands can be achieved simultaneously in the cavity antenna, so that multi-band fusion can be realized by using a single cavity antenna, and the resonant principle of the cavity antenna is briefly described below.

For the cavity antenna, different resonant frequencies can be changed by adjusting the size of the cavity plate 200, and the resonant frequency of the cavity antenna can be adjusted by adjusting the position of the feeder terminal K. For the space of the tablet personal computer, the range from 0.5 GHz to 10 GHz can be realized by the cavity antenna theoretically.

Figure 10:
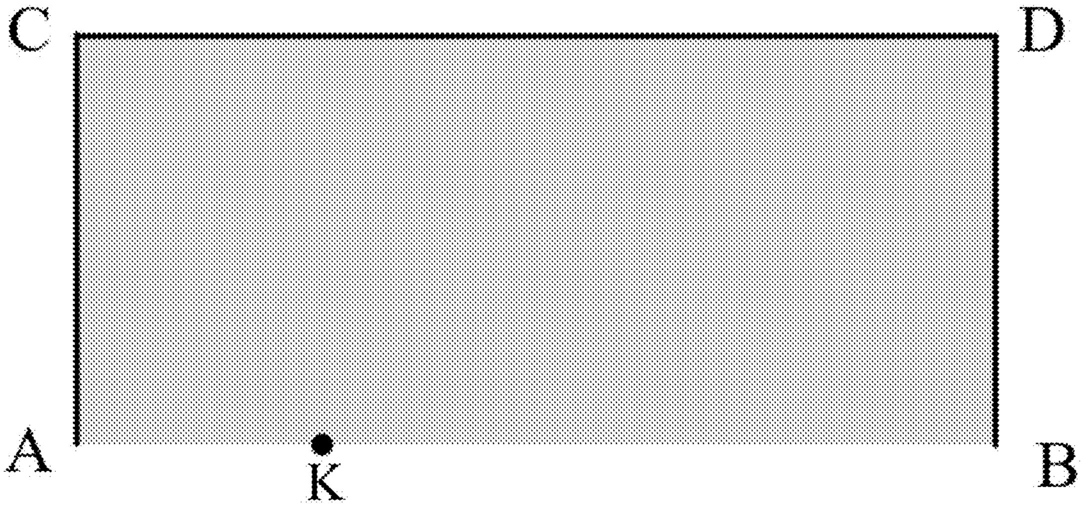
FIG. 10 is a schematic diagram of a cavity antenna of a mobile terminal according to some embodiments of the present disclosure.

FIG. 10 illustrates a simplified model of the cavity antenna of the present disclosure, in which a rectangular structure represents the top view of the cavity plate 200, and A, B, C, and D represent the four top corners of the cavity plate 200, the open end or opening represents the side from point A to point B, and K represents the position of the feed point. The current mode from point A to point K forms a first resonant frequency, the current mode from point B to point K forms a second resonant frequency, and the current mode from point A to point B forms a third resonant frequency, and meanwhile, a high-order resonant mode is formed inside the cavity, resulting in a fourth resonant frequency with multiple current zeros.

In the offset feed state shown in FIG. 10, the first resonant frequency is greater than the second resonant frequency, and the second resonant frequency is greater than the third resonant frequency. As for the fourth resonant frequency, since it is a higher-order resonant mode, the specific excited higher-order mode frequency needs to be determined with reference to the dimensions of the entire cavity structure, which can be understood and fully realized by those skilled in the art, and will not be detailed in the present disclosure.

The structure and principles of the antenna system of the mobile terminal in the embodiments of the present disclosure are described below.

In some embodiments, the antenna system of the mobile terminal in the present disclosure includes a first low-frequency antenna and a second low-frequency antenna. The operating frequency band of the first low-frequency antenna and the second low-frequency antenna is the aforementioned LB frequency band, which covers more important communication frequency bands. In order to ensure that the mobile terminal has a better low-frequency antenna performance during use, the first low-frequency antenna and the second low-frequency antenna can be provided relatively far away from each other in the embodiments of the present disclosure.

In an example where the mobile terminal is the tablet personal computer 10 shown in FIG. 1, the first low-frequency antenna may be provided close to one of the two parallel long sides, and the second low-frequency antenna may be provided close to the other one of the two parallel long sides. Thus, in combination with FIG. 2, when the user uses the tablet personal computer in the landscape mode, at least the low-frequency antenna on the top long side can be guaranteed not to be held, resulting good performance for the low-frequency antenna.

In another example where the mobile terminal is still the tablet personal computer 10 shown in FIG. 1, the first low-frequency antenna can be provided close to one of the two parallel short sides, and the second low frequency antenna can be provided close to the other one of the two parallel short sides. Thus, in combination with FIG. 3, when the user uses the tablet personal computer in the portrait mode, at least the low-frequency antenna on the top short side can be guaranteed not to be held, resulting good performance for the low-frequency antenna.

In conclusion, in the antenna system of the present disclosure, the two low-frequency antennas are separated relatively, so that the radiation performance of the low-frequency antennas will not decrease too much during the use of the mobile terminal, and the low frequency radiation efficiency can be guaranteed.

In some embodiments of the present disclosure, at least one of the first low-frequency antenna and the second low-frequency antenna is a cavity antenna, and the structure of the cavity antenna can be referred to in the foregoing description, and will not be repeated herein.

It can be understood that, in the embodiments of the present disclosure, the first low-frequency antenna and the second low-frequency antenna may both be cavity antennas, or alternatively, one of them may be a cavity antenna, and the other may be a conventional antenna provided on the connection surface of the support body 30 as shown in FIG. 7, which are described below respectively.

Figure 11:
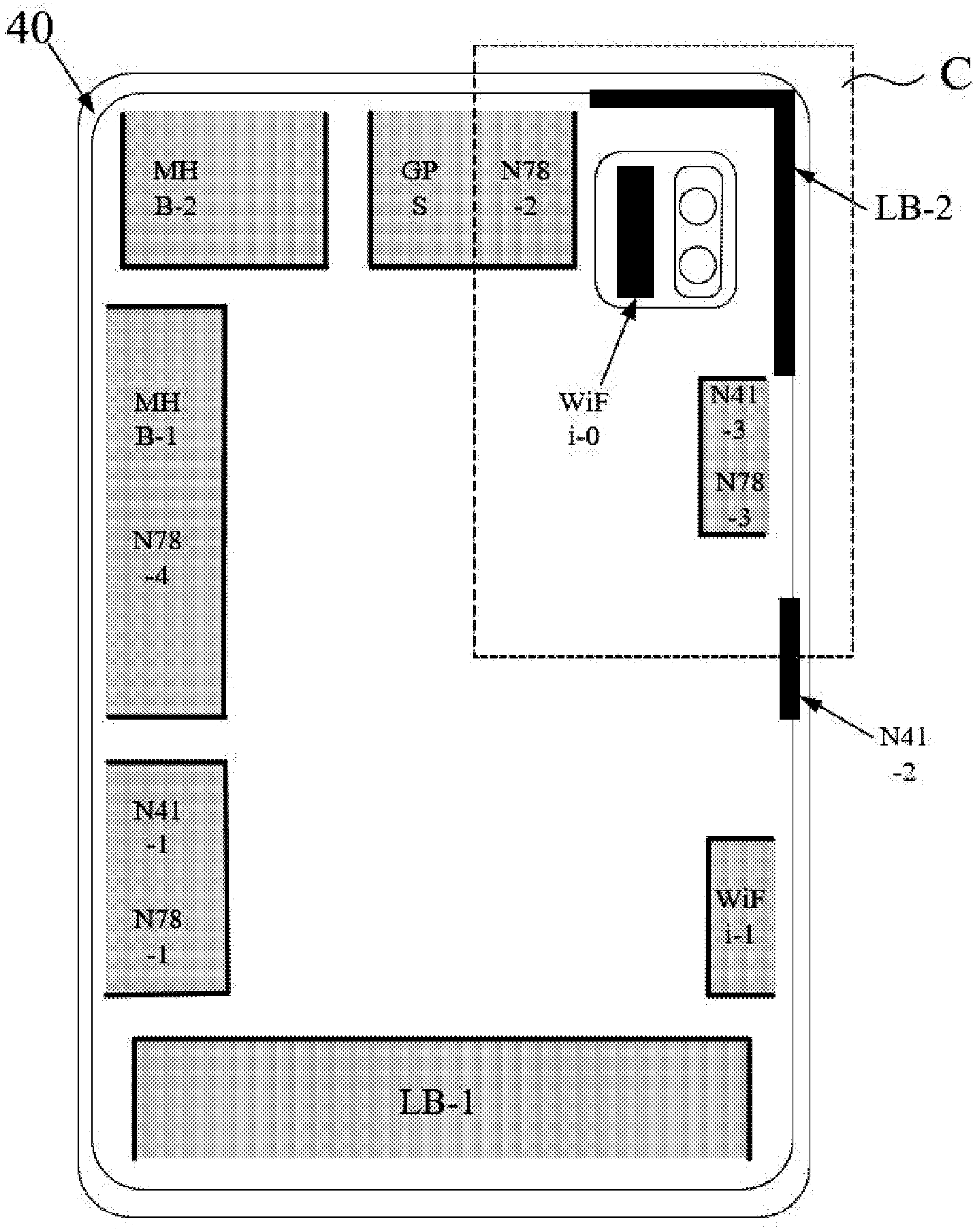
FIG. 11 is a schematic diagram of a structure of an antenna system of a mobile terminal according to some embodiments of the present disclosure.

FIG. 11 illustrates an antenna system distribution diagram of a mobile terminal in some embodiments of the present disclosure, and the embodiments of the present disclosure are described below in conjunction with FIG. 11.

As shown in FIG. 11, the frame 40 is enclosed by two long sides and two short sides, the gray rectangle in the figure represents the cavity antenna, the three black sides of each cavity antenna represent the closed ends, and the non-black sides are the open ends. As can be seen from this embodiment, the open end of the cavity antenna is close to the black border between the frame and the screen component, thereby improving the radiation performance of the antenna.

In this embodiment, the first low-frequency antenna LB-1 is a cavity antenna and is provided close to a bottom short side; and the second low-frequency antenna LB-2 is a conventional inverted-F antenna (IFA), and its antenna radiator can be provided on the connection surface between the support body 30 and the screen component 20 through the FPC or LDS process, which will be understood by those skilled in the art with reference to the foregoing description and will not be repeated herein.

In some embodiments of the present disclosure, the second low-frequency antenna LB-2 is provided close to a top short side, and is located in the target clearance area C. In combination with the aforementioned usage scenarios in FIG. 2 and FIG. 3, it can be seen that the target clearance area C is an advantageous area that the user cannot hold no matter whether the landscape or portrait mode is used, so the second low-frequency antenna LB-2 will have a better antenna performance in the target clearance area C under the user's usage state.

In one example, for a tablet personal computer, the dimensions of the cavity structure of the first low-frequency antenna LB-1 may be, for example, 155 mm*40 mm.

As can be seen from the above, in this embodiment of the present disclosure, the first low-frequency antenna and the second low-frequency antenna are provided relatively far away from each other, so as to ensure that at least one low-frequency antenna of the mobile terminal will not be directly held in a state of use, reduce the degree of low-frequency signal attenuation, and then improve the antenna performance of the low-frequency frequency band. In addition, by providing the second low-frequency antenna in the target clearance area, the radiation performance requirements can be met by utilizing a conventional antenna due to the better antenna clearance environment in the target clearance area, which saves the occupancy of the antenna system on the internal space and simplifies the structure of the antenna.

In the embodiment shown in FIG. 11, the antenna system further includes a medium-high frequency antenna group, which includes two medium-high frequency antennas, i.e., a first medium-high frequency antenna MHB-1 and a second medium-high frequency antenna MHB-2, shown in FIG. 11. The first medium-high frequency antenna MHB-1 is provided close to the left long side, and the second medium-high frequency antenna MHB-2 is provided close to the top short side. In this embodiment, the first medium-high frequency antenna MHB-1 and the second medium-high frequency antenna MHB-2 are both cavity antennas.

Combining the aforementioned usage scenarios shown in FIGS. 2 and 3, it can be understood that in the landscape mode of the mobile terminal, although the second medium-high frequency antenna MHB-2 will be held by the user, resulting in a larger degradation of the antenna performance, the first medium-high frequency antenna MHB-1 will not be held by the user, resulting in a better antenna performance. Similarly, when the mobile terminal is used in the portrait mode, although there is a risk that the first medium-high frequency antenna MHB-1 will be held by the user and lead to a larger degradation of the antenna performance, the second medium-high frequency antenna MHB-2 on the top will not be held by the user and has a better antenna performance.

In other words, in the embodiments of the present disclosure, for the more important medium-high frequency band, the two medium-high frequency antennas are provided separately, so that at least one antenna will not be directly held by the user, regardless of whether the user is using the landscape mode or the portrait mode, thereby guaranteeing the antenna performance of the medium-high frequency band.

In the embodiment shown in FIG. 11, the operating frequency band of the medium-high frequency antenna group also includes the N41 band. As shown in FIG. 11, the antenna N41-1 is provided close to the left long side, and the antenna N41-3 is provided close to the right long side, and the antenna N41-1 and the antenna N41-3 are cavity antennas and are provided separately relative to each other to effectively reduce the risk of antenna performance attenuation caused by being held at the same time, and improve the antenna performance. In addition, the antennas of the N41 band also include the antenna N41-2, which is an FPC antenna located on the connection surface of the support body and is provided close to the right long side, and serves as a supplementary antenna to further guarantee the antenna performance.

In some embodiments, the antenna system further includes a positioning antenna, which may be a GPS antenna. For example, as shown in FIG. 11, the GPS antenna is provided close to the top short side and is also a cavity antenna.

It can be understood that since the positioning antenna is placed on the top, the antenna performance is better in the portrait mode, which meets the requirements of navigation scenarios. Meanwhile, due to the advantages of directional radiation and anti-interference ability of the cavity antenna, the antenna can also meet the performance requirements in the landscape mode.

In some embodiments, the antenna system further includes a high-frequency antenna group, which mainly includes antennas of the N78 band. In the embodiments of the present disclosure, the N78 band of the high-frequency antennas may be fused in the aforementioned antennas, and the antenna fusion may be realized by utilizing a higher-order mode or tuning matching, and a plurality of high-frequency antennas are dispersed.

In the embodiment shown in FIG. 11, the antenna N78-1 is fused with the aforementioned antenna N41-1, the antenna N78-2 is fused with the aforementioned GPS antenna, the antenna N78-3 is fused with the aforementioned antenna N41-3, and the antenna N78-4 is fused with the aforementioned first medium-high frequency antenna MHB-1. For the fusion method of the antenna frequency bands, please refer to aforementioned resonant principle of the cavity antenna in FIG. 10, which will not repeated herein. It can be understood that, in this embodiment of the present disclosure, three antennas N78 are provided on the long sides and one antenna N78 is provided on the top short side, which improves the antenna performance of the high-frequency band under the use of mobile terminals.

In some embodiments, the antenna system further includes a Wi-Fi antenna group, which includes at least two Wi-Fi antennas. In the embodiment shown in FIG. 11, the antenna WiFi-0 is provided in the camera module of the mobile terminal, and the antenna WiFi-1 is provided close to the right long side. The antenna WiFi-1 is a cavity antenna, and the antenna WiFi-0 can be, for example, an FPC antenna, LDS antenna, etc.

It can be understood that the Wi-Fi antenna is one of the most important antennas for tablet personal computers. In this embodiment of the present disclosure, the antenna WiFi-0 is provided in the camera module, so its radiation direction is mainly toward the back of the tablet personal computer; while the antenna WiFi-1 is a cavity antenna, which mainly radiates outward through the black border, so its radiation direction is mainly toward the front of the tablet personal computer. The Wi-Fi antennas in both the front and rear radiation directions can guarantee Wi-Fi performance in all directions of the mobile terminal.

In one example, the Wi-Fi antenna may include only the Wi-Fi 2.4G band, or may include both the Wi-Fi 2.4G and Wi-Fi 5G bands.

As can be seen from the above, in the embodiments of the present disclosure, the cavity antenna can realize the antenna performance requirements of a mobile terminal with an all-metal housing, thereby eliminating the need to open a slit in the terminal housing, improving the consistency of the appearance, and improving the appearance of the terminal by means of the metal housing. Moreover, a plurality of same frequency antennas in the antenna system are arranged separately, thereby ensuring that at least one antenna will not be directly held by a user during the use of the mobile terminal, and thus reducing the risk of antenna performance attenuation due to the user's holding, and improving the antenna radiation performance.

Continuing to refer to FIG. 11, for the first low-frequency antenna LB-1, the resonant frequency is low and therefore the cavity size is long. In addition, for the space of the tablet personal computer, it is often necessary to provide at least a loudspeaker at the bottom, and the loudspeaker needs to generate sound through a sound cavity and a sound outlet hole on the frame 40. Further, in order to realize stereo sound, some mobile terminals often need to be equipped with at least one loudspeaker at the top and the bottom of the terminal, respectively, for example, to create a 4-loudspeaker or even 8-loudspeaker stereo sound.

In some embodiments of the present disclosure, the cavity structure of the cavity antenna may be combined with the sound cavity of the loudspeaker, i.e., the loudspeaker is provided in the cavity structure of the cavity antenna, and the cavity structure of the cavity antenna serves as the sound cavity of the loudspeaker. Thus, the cavity structure of the cavity antenna is multiplexed without the need for an additional sound cavity structure to increase the degree of space stacking of the mobile terminal and to improve the space utilization rate.

However, since the cavity antenna has a loudspeaker in its cavity structure, the loudspeaker control signal may cross-talk with the antenna resonant signals, leading to noise, interference, and other problems with the loudspeaker, and at the same time, the antenna signals are affected by the magnet of the loudspeaker, resulting in performance degradation. In order to solve the signal crosstalk problem between the loudspeaker and the cavity antenna, some embodiments of the present disclosure may be optimized in terms of structure and circuitry.

Figure 12:
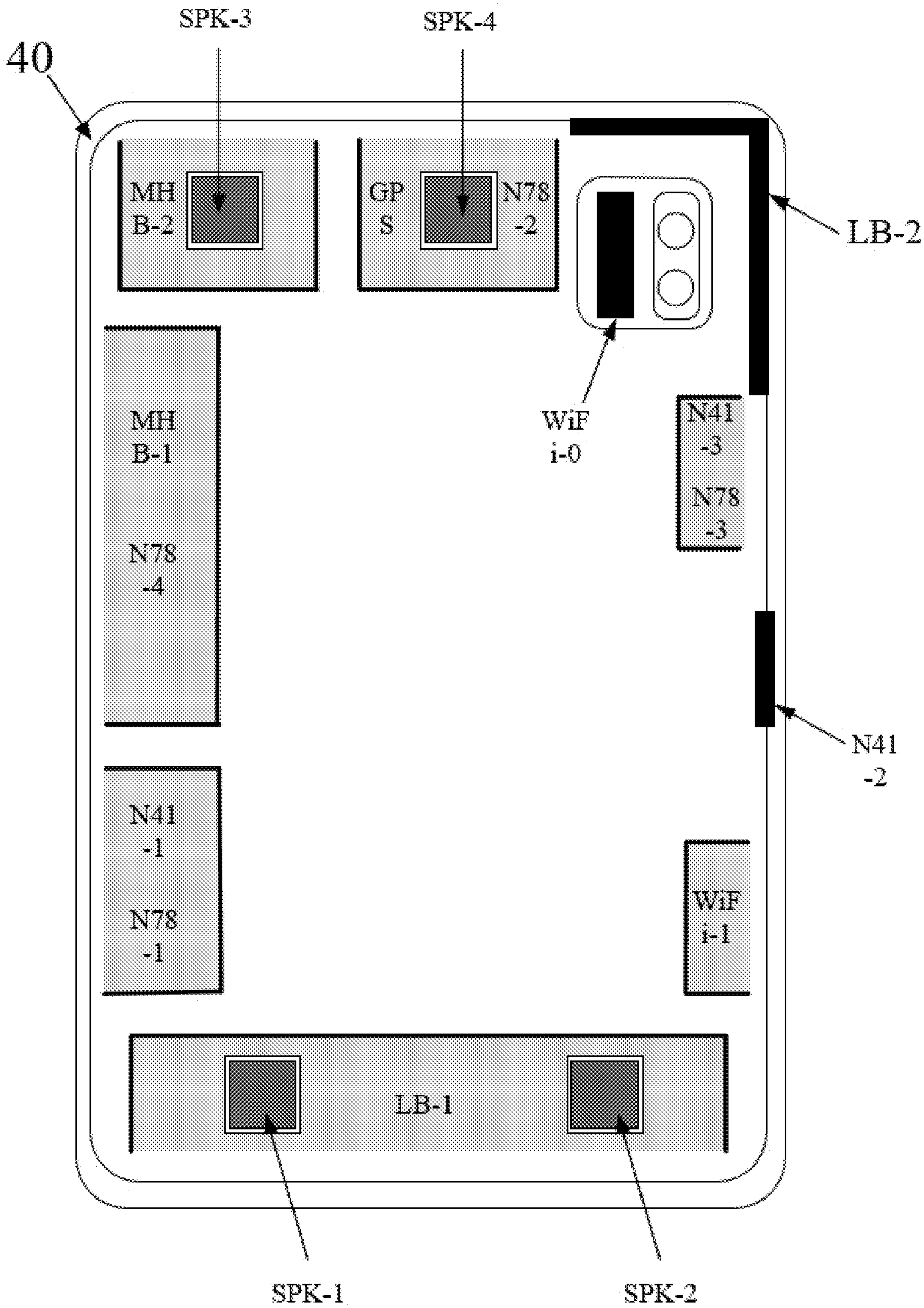
FIG. 12 is a schematic diagram of a structure of an antenna system of a mobile terminal according to some embodiments of the present disclosure.

As shown in FIG. 12, for the first low-frequency antenna LB-1 at the bottom, two loudspeakers, SPK-1 and SPK-2, need to be provided inside, and two loudspeakers are provided in the antenna MHB-2 and the GPS antenna at the top, respectively, i.e., SPK-3 and SPK-4. Thus, in this embodiment of the present disclosure, two loudspeakers at the top and two loudspeakers at the bottom can form a 4-loudspeaker stereo sound, which improves the audio effect of the mobile terminal.

In the embodiments of the present disclosure, in order to avoid the signal crosstalk, an avoidance aperture, penetrating the cavity antenna at a position corresponding to the loudspeaker, is provided. That is, the avoidance aperture is provided on the cavity plate at the position corresponding to the loudspeaker, as shown in FIG. 12. As the position of the avoidance aperture corresponds to the loudspeaker structure and the current gathering at the position of the loudspeaker magnet is dense, the avoidance aperture is provided to effectively avoid the dense current area, thus avoiding the interference of the electromagnetic signal of the loudspeaker to the antenna signal and improving the antenna radiation performance. Moreover, since the edge of the cavity plate is not broken, the current mode of the cavity plate is very little affected by the avoidance aperture, and the radiation performance of the cavity antenna will not be affected too much, which can meet the design requirements.

Figure 17:
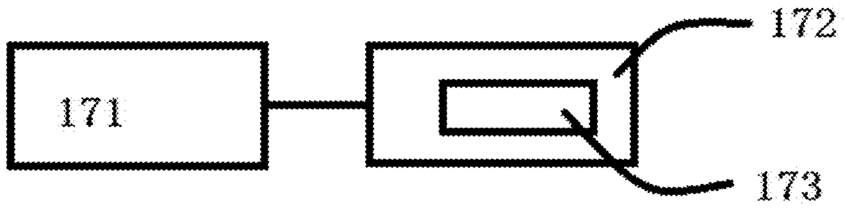
FIG. 17 is a schematic diagram of an arrangement of a loudspeaker, a control circuit and a filter device according to some embodiments of the present disclosure.

In addition, a filter device can be provided on a control circuit of the loudspeaker, for example, two magnetic beads can be provided in series in the circuit of the loudspeaker, and the magnetic beads can filter the antenna signals, so as to avoid the interference of the antenna signals to the loudspeaker. For example, referring to FIG. 17, an arrangement of a filter device 173 and a control circuit 172 of a loudspeaker 173 are shown.

As can be seen from the above, in the embodiments of the present disclosure, the sound cavity of the loudspeaker is combined with the cavity antenna structure to improve the utilization of space, and at the same time, the avoidance structure and the filter device are used to mitigate or eliminate the signal crosstalk between the loudspeaker and the cavity antenna, so as to improve the antenna radiation performance and the audio performance of the terminal. Moreover, this antenna system of the present disclosure can meet the requirements of Specific Absorption Rate (SAR) performance regulations without reducing the antenna's transmission power through actual measurements, which greatly improves the signal experience of the user in the state of use.

In the embodiments of FIGS. 11 and 12 above, due to the long size of the cavity required for the low-frequency antenna, it is difficult to design the cavity antenna for the antenna LB-2 on the top due to the restriction of the internal space of the mobile terminal. In order to further reduce the cavity antenna on the internal space of the terminal, the present disclosure provides another cavity antenna structure, which is illustrated below in conjunction with FIG. 13.

Figure 13:
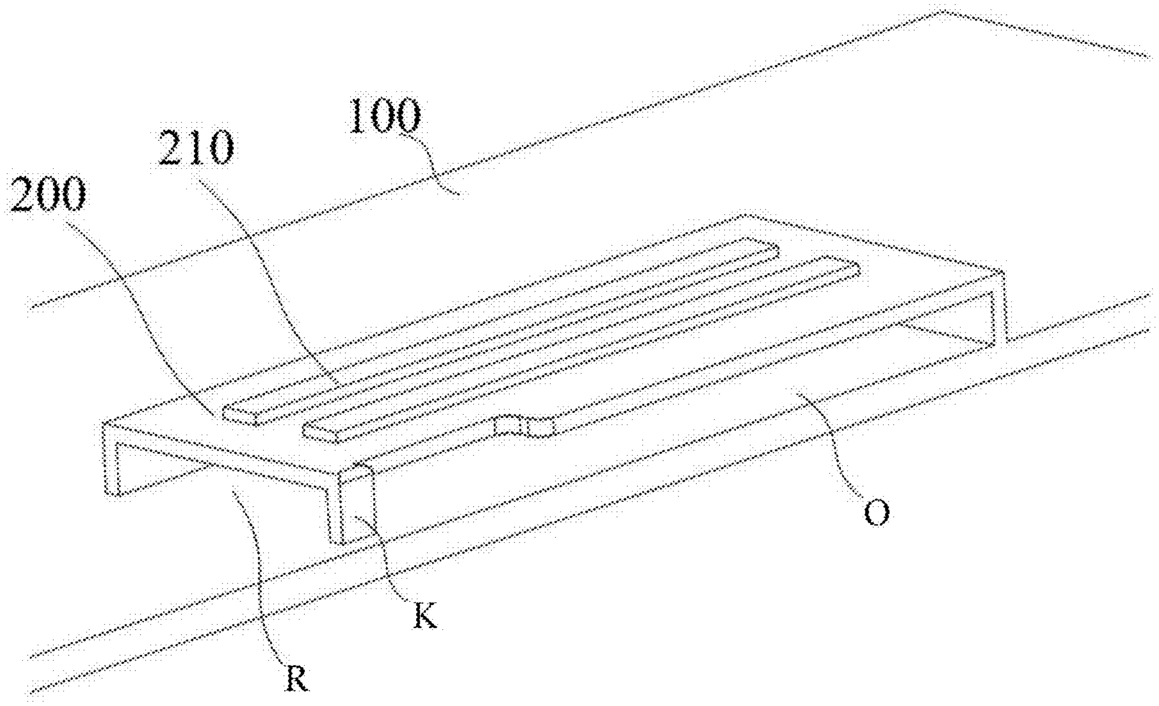
FIG. 13 is a schematic diagram of a structure of a cavity antenna of a mobile terminal according to some embodiments of the present disclosure.

As shown in FIG. 13, in some embodiments of the present disclosure, the cavity antenna includes a cavity plate 200 made of conductor material, and the cavity plate 200 is snap-fitted and connected to the circuit board 100 to form a cavity structure. The difference from the embodiment of FIG. 8 is that in the embodiment of FIG. 8, the cavity antenna only includes one opening O on one side, whereas in the embodiment of FIG. 13, the cavity antenna includes two open ends on adjacent sides, opening O and opening R, respectively.

In the embodiment shown in FIG. 13, by providing open ends on the two adjacent sides of the cavity structure, the cavity antenna is equivalent to a Planar Inverted F-shaped Antenna (PIFA) that is grounded through the other two adjacent sides and fed through the feeder terminal K, and thus the current mode of the cavity antenna is changed from the original ½-wavelength mode to the ¼-wavelength mode, and the size of the required cavity plate is greatly reduced. Moreover, compared with the common PIFA antenna, due to the grounding area increased to form the cavity structure, the antenna resonant wave will be oscillated in the cavity structure, so the cavity antenna also has the advantages of directional radiation, high stability, strong anti-interference ability, etc.

In order to distinguish from the aforementioned cavity antenna of FIG. 8, the antenna shown in FIG. 13 with open ends on two adjacent sides of the cavity plate is defined as a "half-cavity antenna" in the present disclosure. It can be understood that in the embodiment shown in FIG. 13, the half-cavity antenna can have the characteristics of the PIFA antenna with ¼ wavelength as well as the characteristics of the cavity antenna in FIG. 8.

In the embodiment shown in FIG. 11, the size of the first low-frequency antenna LB-1 is 155 mm*40 mm, which can be reduced to 90 mm*40 mm by using the half-cavity antenna shown in FIG. 13, reducing the space occupied by the antenna by 42%.

It can be understood by those skilled in the art that the various structures of the aforementioned cavity plate 200 and their combination with a loudspeaker can be applied to the half-cavity antenna described in the present disclosure in the similar or same way as described in the foregoing description, which can be referred to by those skilled in the art and will not be repeated herein.

As can be seen from the above, in the embodiments of the present disclosure, the antenna size can be effectively reduced by using a half-cavity antenna, so that on the basis of the embodiment of FIG. 11, at least one of the first low-frequency antenna LB-1 and the second low-frequency antenna LB-2 can be realized by using a half-cavity antenna. For example, as shown in FIG. 14, both the first low-frequency antenna LB-1 and the second low-frequency antenna LB-2 adopt half-cavity antennas, thereby reducing the space occupation, which is illustrated below in conjunction with FIG. 14.

Figure 14:
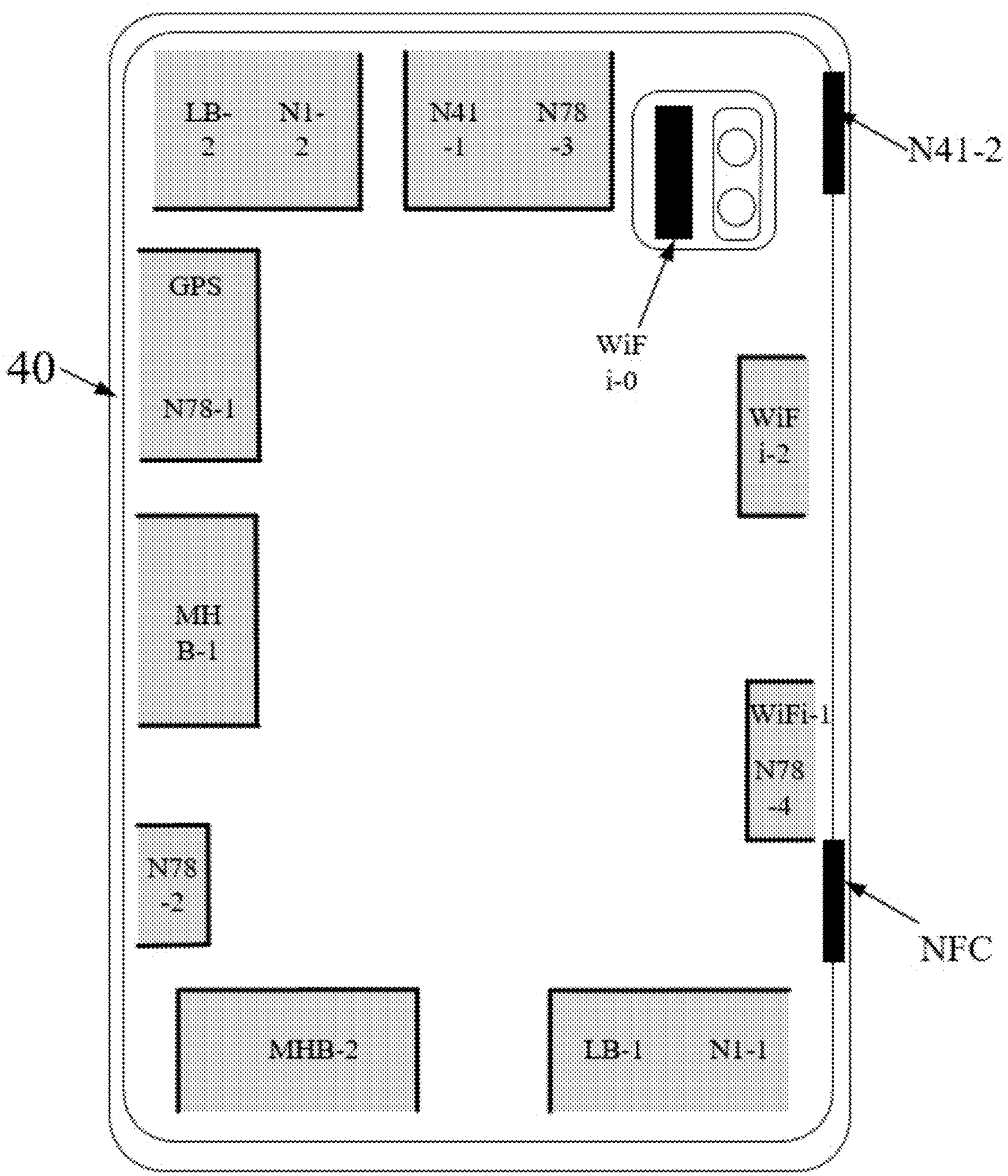
FIG. 14 is a schematic diagram of a structure of an antenna system of a mobile terminal according to some embodiments of the present disclosure.

As shown in FIG. 14, in some embodiments, the first low-frequency antenna LB-1 and the second low-frequency antenna LB-2 in the antenna system of the present disclosure are located at two diagonal positions of the mobile terminal. For example, in FIG. 14, the first low-frequency antenna LB-1 is provided at the lower right corner of the frame 40, and the second low-frequency antenna LB-2 is provided at the upper left corner of the frame 40.

Moreover, in this embodiment of the present disclosure, the first low-frequency antenna LB-1 and the second low-frequency antenna LB-2 are both half-cavity antennas, so the size of the antennas will be greatly reduced, and the first low-frequency antenna LB-1 will not occupy the entire bottom space, and the second low-frequency antenna LB-2 can also be designed in the top space.

In combination with the aforementioned usage scenarios in FIGS. 2 and 3, it can be seen that since the first low-frequency antenna LB-1 and the second low-frequency antenna LB-2 are respectively located at two diagonal positions of the mobile terminal, no matter whether the mobile terminal is used in the landscape mode or portrait mode, it is guaranteed that at least one of the two low-frequency antennas will not be directly held by the user, so as to ensure better low-frequency antenna performance of the mobile terminal in the process of usage.

In the embodiment shown in FIG. 14, the antenna system further includes a medium-high frequency antenna group, which includes two medium-high frequency antennas, i.e., a first medium-high frequency antenna MHB-1 and a second medium-high frequency antenna MHB-2, shown in FIG. 14. The first medium-high frequency antenna MHB-1 is provided close to the left long side, and the second medium-high frequency antenna MHB-2 is provided close to the bottom short side. In this embodiment, the first medium-high frequency antenna MHB-1 and the second medium-high frequency antenna MHB-2 are both cavity antennas.

In combination with the aforementioned usage scenarios in FIGS. 2 and 3, it can be understood that in the landscape mode of the mobile terminal, although the second medium-high frequency antenna MHB-2 will be held by the user, resulting in a larger degradation of the antenna performance, the first medium-high frequency antenna MHB-1 will not be held by the user, resulting a better antenna performance. Similarly, when the mobile terminal is used in the portrait mode, although there is a risk that the first medium-high frequency antenna MHB-1 will be held by the user and lead to a larger degradation of the antenna performance, the second medium-high frequency antenna MHB-2 on the bottom will not be held by the user and has a better antenna performance.

In other words, in the embodiments of the present disclosure, for the more important medium-high frequency band, the two medium-high frequency antennas are provided separately, so that at least one antenna will not be directly held by the user, regardless of whether the user is using the landscape mode or the portrait mode, thereby guaranteeing the antenna performance of the medium-high frequency band.

In this embodiment, both the first low-frequency antenna LB-1 and the second low-frequency antenna LB-2 are fused with the N1 band, which will not be repeated herein.

In the embodiment shown in FIG. 14, the operating frequency band of the medium-high frequency antenna group also includes the N41 band. As shown in FIG. 14, the antenna N41-1 is provided close to the top short side and the antenna N41-1 is a cavity antenna. The N41-2 antenna adopts an FPC antenna on the connection surface of the support body in the black border, which is provided close to the right long side as a supplementary antenna to further ensure the antenna performance.

In some embodiments, the antenna system further includes a positioning antenna, which may be a GPS antenna. For example, as shown in FIG. 14, the GPS antenna is provided close to the left long side and is also a cavity antenna.

It can be understood that since the positioning antenna is provided close to the long side, the antenna performance is better in the landscape mode, which meets the requirements of navigation scenarios in the landscape mode. Meanwhile, due to the advantages of directional radiation and anti-interference ability of the cavity antenna, the antenna can also meet the performance requirements in the portrait mode.

In some embodiments, the antenna system further includes a Wi-Fi antenna group, which includes at least two Wi-Fi antennas. In the embodiment shown in FIG. 14, the antenna WiFi-0 is provided in the camera module of the mobile terminal, the antenna WiFi-1 and the antenna WiFi-2 are provided close to the right long side. The antennas WiFi-1 and WiFi-2 are cavity antennas, and the antenna WiFi-0 can be, for example, an FPC antenna, LDS antenna, etc.

It can be understood that the Wi-Fi antenna is one of the most important antennas for tablet personal computers. In the embodiments of the present disclosure, the antenna WiFi-0 is provided in the camera module, so its radiation direction is mainly toward the back of the tablet personal computer; while the antennas WiFi-1 and WiFi-2 are cavity antennas, which mainly radiate outward through the black border, so their radiation directions are mainly toward the front of the tablet personal computer. The Wi-Fi antennas in both the front and rear radiation directions can guarantee Wi-Fi performance in all directions of the mobile terminal.

In one example, the Wi-Fi antenna may include only the Wi-Fi 2.4G band, or may include both the Wi-Fi 2.4G and Wi-Fi 5G bands.

In some embodiments, the antenna system further includes a high-frequency antenna group, which mainly includes antennas of the N78 band. In the embodiments of the present disclosure, the N78 band of the high-frequency antennas may be fused in the aforementioned antennas or provided individually, and a plurality of high-frequency antennas are dispersed.

For example, in the embodiment shown in FIG. 14, the antenna N78-1 is fused to the GPS antenna. The antenna N78-2 is provided close to the left long side and is a cavity antenna. The antenna N78-3 is fused to the aforementioned antenna N41-1. The antenna N78-4 is fused with the aforementioned antenna WiFi-1. For the fusion method of the antenna frequency bands, please refer to aforementioned resonant principle of the cavity antenna in FIG. 10, which will not repeated herein. It can be understood that, in this embodiment of the present disclosure, three antennas N78 are provided on the long sides and one antenna N78 is provided on the top short side, which improves the antenna performance of the high-frequency band under the use of mobile terminals.

In some embodiments, the antenna system further includes a Near Field Communication (NFC) antenna, e.g., in the example of FIG. 14, the NFC antenna may be an FPC antenna provided on the connection surface of the support body in the black border, which is provided close to the right long side.

In some embodiments of the present disclosure, each cavity antenna may be either a cavity antenna as shown in FIG. 8 or a half-cavity antenna as shown in FIG. 13, which is not limited by the present disclosure.

Moreover, it can be understood that for the antenna system shown in FIG. 14, the loudspeaker can also be integrated in each cavity antenna or half-cavity antenna, which can undoubtedly be understood and adequately implemented by those skilled in the art with reference to the foregoing description and will not be detailed herein.

As can be seen from the above, in the embodiments of the present disclosure, the cavity antenna can realize the antenna performance requirements of a mobile terminal with an all-metal housing, thereby eliminating the need to open a slit in the terminal housing, improving the consistency of the appearance, and improving the appearance of the terminal by means of the metal housing. Moreover, the area occupied by the antenna is substantially reduced by the half-cavity antenna structure, and the space utilization rate is improved. Furthermore, a plurality of same frequency antennas in the antenna system are arranged separately, thereby ensuring that at least one antenna will not be directly held by a user during the use of the mobile terminal, and thus reducing the risk of antenna performance attenuation due to the user's holding, and improving the antenna radiation performance.

N79 frequency band or N79 band refers to the communication frequency band with a frequency range of 4.8 GHz~4.9 GHZ. With the development of 5G technology, people pay more and more attention to the application of the N79 frequency band in mobile terminals. Therefore, in the embodiments of the present disclosure, the N79 frequency band can be further fused with the antenna system of the mobile terminal, so as to support more frequency bands.

Figure 15:
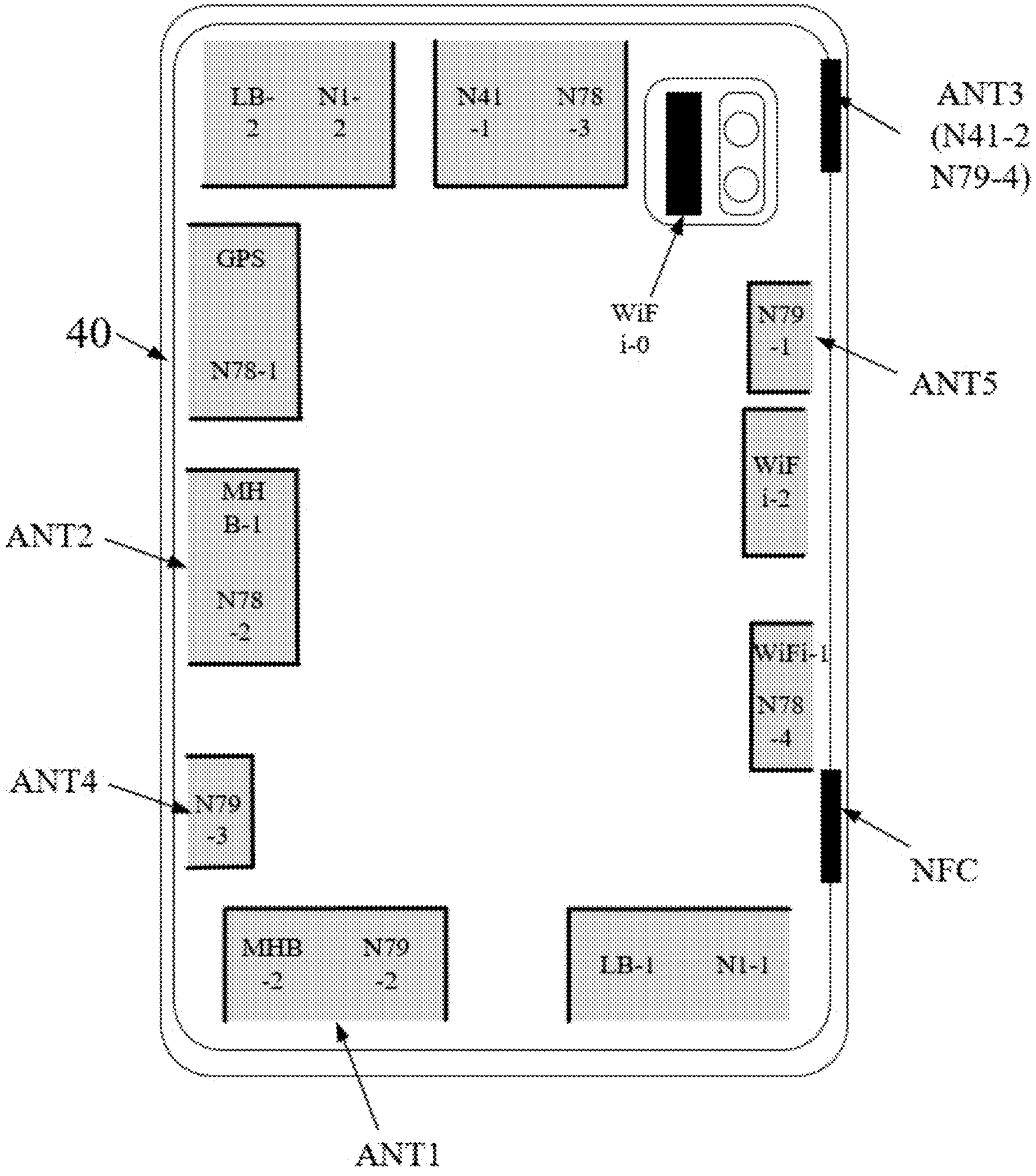
FIG. 15 is a schematic diagram of a structure of an antenna system of a mobile terminal according to some embodiments of the present disclosure.

FIG. 15 illustrates an antenna system structure for a mobile terminal in some embodiments of the present disclosure. A description is provided below in conjunction with FIG. 15.

As shown in FIG. 15, in this embodiment of the present disclosure, the medium-high frequency antenna group of the antenna system includes a first antenna ANT1, a second antenna ANT2, and a third antenna ANT3. The first antenna ANT1 is provided close to the bottom short side, and its operating frequency band includes the MHB band and the N79 band, which is equivalent to the fusion of the N79 band in the antenna MHB-2 based on the implementation of the antenna in FIG. 14. The second antenna ANT2 is provided close to the left long side, and its operating frequency band includes MHB band and N78 band, which is equivalent to the fusion of the N78 band in the antenna MHB-1 based on the implementation of the antenna in FIG. 14.

The third antenna ANT3 is the FPC antenna provided on the connection surface of the support body in the black border, and its operating frequency band includes N41 frequency band and N79 frequency band, which is equivalent to the fusion of the N79 band in the antenna N41-2 based on the implementation of the antenna in FIG. 14. In some embodiments of the present disclosure, when the N79 band is fused in the N41-2 antenna, the radiator in the original FPC form can be changed to realize the fusion of the N41 and N79 bands by using the IFA coupled with the parasitic stub or parasitic branch, which can be understood by those skilled in the art, and will not be detailed herein.

The high-frequency antenna group of the antenna system includes the fourth antenna ANT4 and the fifth antenna ANT5. The fourth antenna is provided close to the left long side, and its operating frequency band includes the N79 frequency band, which is equivalent to that the antenna N79-3 is provided at the position of the antenna N78-2 after the fusion of the antenna N78-2 with the antenna MHB-1 based on the implementation of the antenna in FIG. 14. The fifth antenna ANT5 is provided close to the right long side, and its operating frequency band includes N79 band, which is equivalent to further provide the antenna N79-1 at the position close to the antenna WiFi-2 based on the implementation of the antenna in FIG. 14.

In the embodiment of FIG. 15, the first antenna ANT1, the second antenna ANT2, the fourth antenna ANT4, and the fifth antenna ANT5 are cavity antennas, which will be understood by those skilled in the art with reference to the foregoing description, and will not be repeated herein. In addition, the other antenna structures shown in FIG. 15 can undoubtedly be understood and fully implemented by those skilled in the art with reference to the foregoing description, and will not be repeated herein.

It can be understood that in the embodiment shown in FIG. 15, the antenna performance is enriched by fusing multiple N79 bands, and the multiple N79 bands are arranged separately, thus ensuring that at least one antenna will not be held directly by the user during the use of the mobile terminal. This reduces the risk of antenna performance attenuation caused by the user's holding and improves the antenna radiation performance.

In the embodiments of the present disclosure, the antenna located in the camera module may be an FPC antenna or a metal slot antenna.

For example, in some embodiments, the antenna radiator inside the camera module can be implemented through the FPC antenna, that is, the radiator of the fifth antenna is located inside the cover plate of the camera module. In this case, the cover plate of the camera module is not made of metal, but non-metallic materials such as glass and plastic can be used.

For example, in other embodiments, the cover plate of the camera module is made of metal material. In this case, the antenna inside the module cannot be the FPC antenna inside the camera module. Instead, it can be implemented by a metal slot which is formed by opening a slit in the cover plate of the camera module. The specific implementation and working principle of slot antennas can be understood by those skilled in the art with reference to the relevant technologies, and will not be detailed herein.

In the above embodiments of the present disclosure, only the arrangement of the radiator of the antenna system of the mobile terminal is illustrated, and other electrical structures included in the antenna system, such as radio frequency circuits, matching circuits, tuning switches, and the like, can be understood and fully realized by those skilled in the art with reference to the relevant technologies, and will not be detailed herein.

Figure 16:
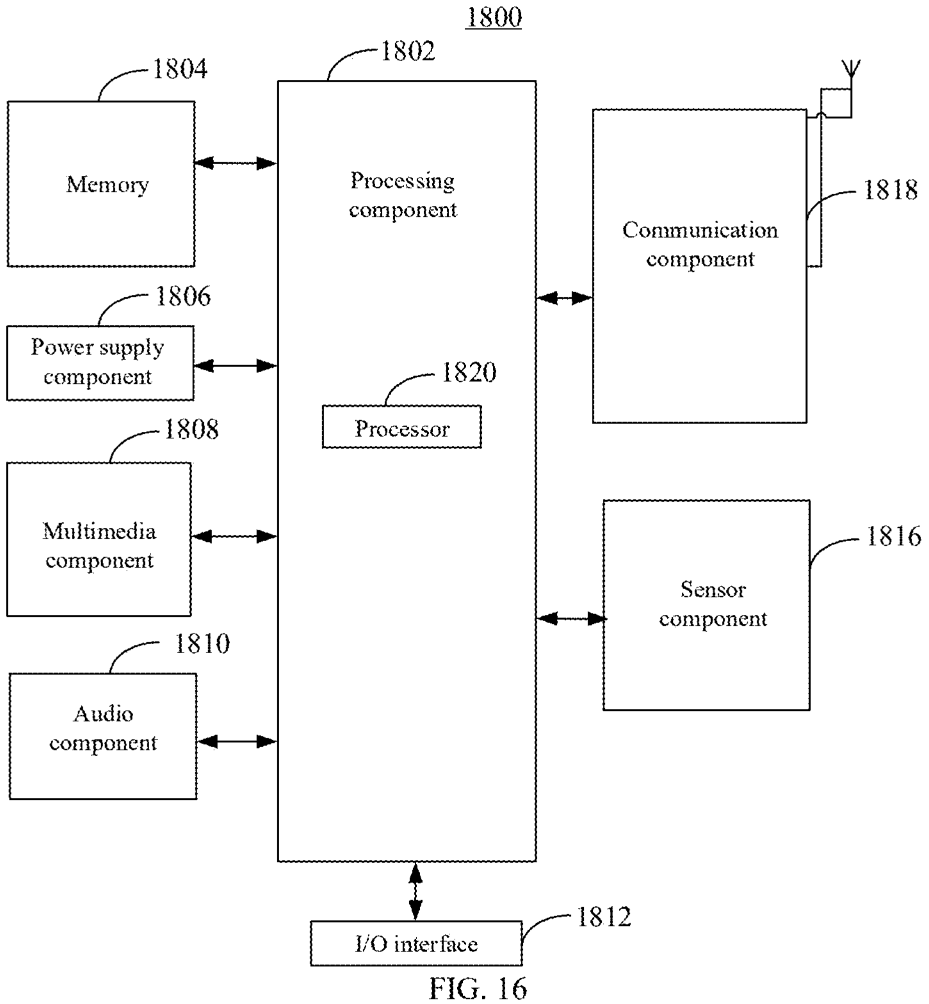
FIG. 16 is a block diagram of a structure of a mobile terminal according to some embodiments of the present disclosure.

FIG. 16 illustrates a block diagram of a structure of a mobile terminal in some embodiments of the present disclosure. The principles related to the mobile terminal in some embodiments of the present disclosure are described below in conjunction with FIG. 16.

Referring to FIG. 16, the mobile terminal 1800 may include one or more of the following components: a processing component 1802, a memory 1804, a power supply component 1806, a multimedia component 1808, an audio component 1810, an input/output (I/O) interface 1812, a sensor component 1814, and a communication component 1816.

The processing component 1802 typically controls the overall operation of the mobile terminal 1800, such as operations associated with display, telephone call, data communication, camera operation, and recording operations. The processing component 1802 may include one or more processors 1820 to execute instructions. In addition, the processing component 1802 may include one or more modules that facilitate interaction between the processing component 1802 and other components. For example, the processing component 1802 may include a multimedia module to facilitate interaction between the multimedia component 1808 and the processing component 1802. For another example, the processing component 1802 can read executable instructions from memory to realize functions related to the mobile terminal.

The memory 1804 is configured to store various types of data to support operation at the mobile terminal 1800. Examples of such data include instructions for any application or method to operate on the mobile terminal 1800, contact data, phonebook data, messages, pictures, videos, etc. The memory 1804 may be implemented by any type of volatile or non-volatile storage device or a combination thereof, such as static random-access memory (SRAM), electrically erasable programmable read-only memory (EEPROM), erasable programmable read-only memory (EPROM), programmable read-only memory (PROM), read-only memory (ROM), magnetic memory, flash memory, Disk or CD-ROM.

The power supply component 1806 provides power to the various components of the mobile terminal 1800. The power supply component 1806 may include a power management system, one or more power supplies, and other components associated with generating, managing, and distributing power for the mobile terminal 1800.

The multimedia component 1808 includes a screen that provides an output interface between the mobile terminal 1800 and the user. In some embodiments, the multimedia component 1808 includes a front-facing camera and/or a rear-facing camera. The front-facing camera and/or rear-facing camera can receive external multimedia data when the mobile terminal 1800 is in an operating mode, such as shooting mode or video mode. Each front-facing camera and rear-facing camera may be a fixed optical lens system or have focal length and optical zoom capability.

The audio component 1810 is configured to output and/or input audio signals. For example, the audio component 1810 includes a microphone (MIC) configured to receive external audio signals when the mobile terminal 1800 is in an operating mode, such as call mode, recording mode, and voice recognition mode. The received audio signal may be further stored in the memory 1804 or sent via the communication component 1816. In some embodiments, the audio component 1810 further includes a speaker for outputting the audio signal.

The I/O interface 1812 provides an interface between the processing component 1802 and peripheral interface modules, and the peripheral interface modules may be keypads, click wheels, buttons, etc. These buttons may include, but are not limited to: a home button, a volume button, a start button, and a lock button.

The sensor component 1816 includes one or more sensors for providing status assessment of various aspects of the mobile terminal 1800. For example, the sensor component 1816 may detect an open/closed state of the mobile terminal 1800, relative positioning of components, and the sensor component 1816 may also detect a change in position of the mobile terminal 1800 or a component of the mobile terminal 1800, the presence or absence of user contact with the mobile terminal 1800, an orientation or acceleration/deceleration of the mobile terminal 1800 and temperature changes of the mobile terminal 1800. The sensor component 1816 may include a proximity sensor configured to detect the presence of nearby objects in the absence of any physical contact. The sensor component 1816 may also include a light sensor, such as a CMOS or CCD image sensor, for use in imaging applications. In some embodiments, the sensor component 1816 may also include an accelerometer sensor, a gyroscope sensor, a magnetic sensor, a pressure sensor, or a temperature sensor.

The communication component 1818 is configured to facilitate communication between the mobile terminal 1800 and other devices by wired or wireless means. The mobile terminal 1800 may access a wireless network based on a communication standard, such as Wi-Fi, 2G, 3G, 4G, 5G, 6G or a combination thereof. In one exemplary embodiment, the communication component 1818 receives broadcast signals or broadcast-related information from an external broadcast management system via a broadcast channel. In one exemplary embodiment, the communication component 1818 further includes a near-field communication (NFC) module to facilitate short-range communication. For example, the NFC module may be implemented based on radio frequency identification (RFID) technology, infrared data association (IrDA) technology, ultra-wideband (UWB) technology, Bluetooth® (BT) technology, and other technologies.

In some exemplary embodiments, the mobile terminal 1800 may be implemented by one or more application-specific integrated circuits (ASICs), digital signal processor (DSP), digital signal processing device (DSPD), programmable logic device (PLD), field-programmable gate array (FPGA), controller, microcontroller, microprocessor, or other electronic components.

In some embodiments, the housing includes a frame including two parallel long sides and two parallel short sides, and a backplane connected to a lower end surface of the frame;

wherein the first low-frequency antenna is provided close a bottom short side, and the second low-frequency antenna is provided close to a top short side and in a target clearance area of the mobile terminal, the target clearance area including an overlapping area between a long-side antenna clearance area and a short-side antenna clearance area of the mobile terminal.

In some embodiments, the mobile terminal of the present disclosure further includes a screen component including a cover plate, and a support body provided between the cover plate and the housing, for carrying and assembling the screen component;

wherein the first low-frequency antenna is the cavity antenna, and a radiator of the second low-frequency antenna is provided on a connection surface between the cover plate and the support body.

In some embodiments, the antenna system further includes:

a medium-high frequency antenna group including at least two medium-high frequency antennas; wherein one medium-high frequency antenna of the at least two medium-high frequency antennas is provided close to a long side of the housing, and an other medium-high frequency antenna is provided close to a short side of the housing; and an operating frequency band of the medium-high frequency antenna includes a MHB frequency band and/or a N41 frequency band, and at least one of the at least two medium-high frequency antennas is a cavity antenna.

In some embodiments, the antenna system further includes:

a high-frequency antenna group including at least two high-frequency antennas; wherein one high-frequency antenna of the at least two high-frequency antennas is provided close to a top short side of the housing, and an other high-frequency antenna is provided close to a long side of the housing; and an operating frequency band of the high-frequency antenna includes at least a N78 frequency band, and at least one of the at least two high-frequency antennas is a cavity antenna.

In some embodiments, the antenna system further includes:

a positioning antenna provided close to a top short side of the housing, an operating frequency band of the positioning antenna including a Global Positioning System (GPS) frequency band; and a Wi-Fi antenna group including at least two Wi-Fi antennas, wherein one Wi-Fi antenna of the at least two Wi-Fi antennas is provided close to a long side of the housing, and an other Wi-Fi antenna is provided in a camera module of the mobile terminal, wherein operating frequency bands of the at least two Wi-Fi antennas include a Wi-Fi 2.4G frequency band and/or a Wi-Fi 5G frequency band; and wherein at least one of the positioning antenna and the at least two Wi-Fi antennas is a cavity antenna.

In some embodiments, the cavity antenna includes a cavity plate made of conductor material, snap-fitted and connected to a circuit board of the mobile terminal or the housing made of conductor material, wherein an inner wall of the cavity plate forms a cavity structure with the circuit board or the housing, and a side of the cavity structure includes an opening; and the cavity antenna is provided with a rigid feeder terminal at the opening, one end of the feeder terminal being connected to the cavity plate at the opening, and an other end of the feeder terminal being connected to a radio frequency circuit on the circuit board.

In some embodiments, the cavity structure, formed by the cavity plate and the circuit board, includes a groove penetrating the circuit board at a position of the cavity structure corresponding to the circuit board, a side of the circuit board away from the cavity plate being electrically connected to the housing.

In some embodiments, the cavity antenna includes at least one loudspeaker on the circuit board within the cavity structure, and the cavity plate is provided with an avoidance aperture penetrating the cavity plate at a position corresponding to the at least one loudspeaker; and a filter device for filtering antenna signals is provided on a control circuit of the at least one loudspeaker.

In some embodiments, the cavity antenna includes a cavity plate made of conductor material, snap-fitted and connected to a circuit board of the mobile terminal or the housing made of conductor material, wherein an inner wall of the cavity plate forms a cavity structure with the circuit board or the housing, and at least one of two adjacent sides of the cavity structure includes an opening; and the cavity antenna includes a rigid feeder terminal provided at at least one opening of the two adjacent sides of the cavity structure, one end of the feeder terminal being connected to the cavity plate at the opening, and an other end of the feeder terminal being connected to a radio frequency circuit on the circuit board.

In some embodiments, the first low-frequency antenna and the second low-frequency antenna are cavity antennas, and the first low-frequency antenna and the second low-frequency antenna are respectively provided at two diagonal positions of the housing.

In some embodiments, the antenna system further includes:

a medium-high frequency antenna group including at least two medium-high frequency antennas; wherein one medium-high frequency antenna of the at least two medium-high frequency antennas is provided close to a long side of the housing, and an other medium-high frequency antenna is provided close to a short side of the housing; and an operating frequency band of the medium-high frequency antenna includes a MHB frequency band and/or a N41 frequency band.

In some embodiments, the antenna system further includes:

a high-frequency antenna group including at least two high-frequency antennas; wherein one high-frequency antenna of the at least two high-frequency antennas is provided close to a top short side of the housing, and an other high-frequency antenna is provided close to a long side of the housing; and an operating frequency band of the high-frequency antenna includes at least a N78 frequency band.

In some embodiments, the antenna system further includes:

a positioning antenna provided close to a long side of the housing, an operating frequency band of the positioning antenna including a GPS frequency band; and a Wi-Fi antenna group including at least two Wi-Fi antennas, wherein one Wi-Fi antenna of the at least two Wi-Fi antennas is provided in a camera module of the mobile terminal, and an other Wi-Fi antenna is provided close to the long side of the housing, wherein operating frequency bands of the at least two Wi-Fi antennas include a Wi-Fi 2.4G frequency band and/or a Wi-Fi 5G frequency band.

In some embodiments, the medium-high frequency antenna group includes a first antenna, a second antenna, and a third antenna, the first antenna and the second antenna being cavity antennas, and the third antenna being a Flexible Printed Circuit (FPC) antenna; wherein the first antenna is provided close to a bottom short side of the housing and has an operating frequency band including a MHB frequency band and a N79 frequency band; the second antenna is provided close to the long side of the housing and has an operating frequency band including a MHB frequency band and a N78 frequency band; and a radiator of the third antenna is provided on a connection surface between a cover plate of a screen component and a support body, and an operating frequency band of the antenna includes a N41 frequency band and a N79 frequency band.

In some embodiments, the high-frequency antenna group includes a fourth antenna and a fifth antenna, the fourth antenna and the fifth antenna being cavity antennas; wherein the fourth antenna is provided close to the long side of the housing and has an operating frequency band including a N79 frequency band; and the fifth antenna is provided close to the long side of the housing and has an operating frequency band including a N79 frequency band.

In some embodiments, the mobile terminal includes a tablet personal computer.

It is apparent that the above-described embodiments are merely examples for the purpose of clear illustration and are not intended to be a limitation of the present disclosure. For those of ordinary skill in the art, other variations or changes in different forms may be made on the basis of the above description. It is neither necessary nor possible to exhaust all of the embodiments herein. The variations or changes derived therefrom fall within the scope of protection of the present disclosure.

What is claimed is:

1. A mobile terminal, comprising:

a housing; and an antenna system comprising a first low-frequency antenna and a second low-frequency antenna respectively provided close to two opposite sides of the housing, wherein at least one of the first low-frequency antenna and the second low-frequency antenna is a cavity antenna, wherein the cavity antenna comprises:

a cavity plate made of conductor material, snap-fitted and connected to a circuit board of the mobile terminal or the housing made of conductor material, wherein an inner wall of the cavity plate forms a cavity structure with the circuit board or the housing, and the cavity antenna comprises at least one loudspeaker provided within the cavity structure and between the inner wall of the cavity plate and the circuit board or the housing.

2. The mobile terminal of claim 1, wherein the housing comprises:

a frame comprising two parallel long sides and two parallel short sides; and a backplane connected to a lower end surface of the frame, wherein the first low-frequency antenna is provided close a bottom short side, and the second low-frequency antenna is provided close to a top short side and in a target clearance area of the mobile terminal, the target clearance area comprising an overlapping area between a long-side antenna clearance area and a short-side antenna clearance area of the mobile terminal.

3. The mobile terminal of claim 2, further comprising:

a screen component comprising a cover plate; and a support body provided between the cover plate and the housing, for carrying and assembling the screen component, wherein the first low-frequency antenna is the cavity antenna, and a radiator of the second low-frequency antenna is provided on a connection surface between the cover plate and the support body.

4. The mobile terminal of claim 1, wherein the antenna system further comprises:

a medium-high frequency antenna group comprising at least two medium-high frequency antennas, wherein one medium-high frequency antenna of the at least two medium-high frequency antennas is provided close to a long side of the housing, and an other medium-high frequency antenna is provided close to a short side of the housing, and an operating frequency band of the medium-high frequency antenna comprises at least one of a MHB frequency band or a N41 frequency band, and at least one of the at least two medium-high frequency antennas is a cavity antenna.

5. The mobile terminal of claim 1, wherein the antenna system further comprises:

a high-frequency antenna group comprising at least two high-frequency antennas, wherein one high-frequency antenna of the at least two high-frequency antennas is provided close to a top short side of the housing, and an other high-frequency antenna is provided close to a long side of the housing, and an operating frequency band of the high-frequency antenna comprises at least a N78 frequency band, and at least one of the at least two high-frequency antennas is a cavity antenna.

6. The mobile terminal of claim 1, wherein the antenna system further comprises:

a positioning antenna provided close to a top short side of the housing, an operating frequency band of the positioning antenna comprising a Global Positioning System (GPS) frequency band; and a Wi-Fi antenna group comprising at least two Wi-Fi antennas, wherein one Wi-Fi antenna of the at least two Wi-Fi antennas is provided close to a long side of the housing, and an other Wi-Fi antenna is provided in a camera module of the mobile terminal, wherein operating frequency bands of the at least two Wi-Fi antennas comprise at least one of a Wi-Fi 2.4G frequency band or a Wi-Fi 5G frequency band, wherein at least one of the positioning antenna and the at least two Wi-Fi antennas is a cavity antenna.

7. The mobile terminal of claim 1, wherein a side of the cavity structure comprises an opening; and wherein the cavity antenna further comprises: a rigid feeder terminal provided at the opening, one end of the feeder terminal being connected to the cavity plate at the opening, and an other end of the feeder terminal being connected to a radio frequency circuit on the circuit board.

8. The mobile terminal of claim 7, wherein the cavity structure, formed by the cavity plate and the circuit board, comprises a groove penetrating the circuit board at a position of the cavity structure corresponding to the circuit board, a side of the circuit board away from the cavity plate being electrically connected to the housing.

9. The mobile terminal of claim 7, wherein the cavity plate is provided with an avoidance aperture penetrating the cavity plate at a position corresponding to the at least one loudspeaker; and a filter device for filtering antenna signals is provided on a control circuit of the at least one loudspeaker.

10. The mobile terminal of claim 1 wherein at least one of two adjacent sides of the cavity structure comprises an opening; and wherein the cavity antenna further comprises: a rigid feeder terminal provided at at least one opening of the two adjacent sides of the cavity structure, one end of the feeder terminal being connected to the cavity plate at the opening, and an other end of the feeder terminal being connected to a radio frequency circuit on the circuit board.

11. The mobile terminal of claim 10, wherein the first low-frequency antenna and the second low-frequency antenna are cavity antennas, and the first low-frequency antenna and the second low-frequency antenna are respectively provided at two diagonal positions of the housing.

12. The mobile terminal of claim 10, wherein the antenna system further comprises:

a medium-high frequency antenna group comprising at least two medium-high frequency antennas; and wherein one medium-high frequency antenna of the at least two medium-high frequency antennas is provided close to a long side of the housing, and an other medium-high frequency antenna is provided close to a short side of the housing; and an operating frequency band of the medium-high frequency antenna comprises at least one of a MHB frequency band or a N41 frequency band.

13. The mobile terminal of claim 12, wherein the medium-high frequency antenna group comprises a first antenna, a second antenna, and a third antenna, the first antenna and the second antenna being cavity antennas, and the third antenna being a Flexible Printed Circuit (FPC) antenna; and wherein the first antenna is provided close to a bottom short side of the housing and has an operating frequency band comprising a MHB frequency band and a N79 frequency band;

the second antenna is provided close to the long side of the housing and has an operating frequency band comprising a MHB frequency band and a N78 frequency band; and a radiator of the third antenna is provided on a connection surface between a cover plate of a screen component and a support body, and an operating frequency band of the antenna comprises a N41 frequency band and a N79 frequency band.

14. The mobile terminal of claim 10, wherein the antenna system further comprises:

a high-frequency antenna group comprising at least two high-frequency antennas; and wherein one high-frequency antenna of the at least two high-frequency antennas is provided close to a top short side of the housing, and an other high-frequency antenna is provided close to a long side of the housing; and an operating frequency band of the high-frequency antenna comprises at least a N78 frequency band.

15. The mobile terminal of claim 14, wherein the high-frequency antenna group comprises a fourth antenna and a fifth antenna, the fourth antenna and the fifth antenna being cavity antennas; and the fourth antenna is provided close to the long side of the housing and has an operating frequency band comprising a N79 frequency band; and the fifth antenna is provided close to the long side of the housing and has an operating frequency band comprising a N79 frequency band.

16. The mobile terminal of claim 10, wherein the antenna system further comprises:

a positioning antenna provided close to a long side of the housing, an operating frequency band of the positioning antenna comprising a GPS frequency band; and a Wi-Fi antenna group comprising at least two Wi-Fi antennas, wherein one Wi-Fi antenna of the at least two Wi-Fi antennas is provided in a camera module of the mobile terminal, and an other Wi-Fi antenna is provided close to the long side of the housing, wherein operating frequency bands of the at least two Wi-Fi antennas comprise at least one of a Wi-Fi 2.4G frequency band or a Wi-Fi 5G frequency band.

17. A tablet personal computer, comprising:

a housing, and an antenna system comprising a first low-frequency antenna and a second low-frequency antenna respectively provided close to two opposite sides of the housing, wherein at least one of the first low-frequency antenna and the second low-frequency antenna is a cavity antenna, wherein the cavity antenna comprises:

a cavity plate made of conductor material, snap-fitted and connected to a circuit board of the tablet personal computer or the housing made of conductor material, wherein an inner wall of the cavity plate forms a cavity structure with the circuit board or the housing, and the cavity antenna comprises at least one loudspeaker provided within the cavity structure and between the inner wall of the cavity plate and the circuit board or the housing.

18. The tablet personal computer of claim 17, wherein the housing comprises:

a frame comprising two parallel long sides and two parallel short sides, and a backplane connected to a lower end surface of the frame; and wherein the first low-frequency antenna is provided close a bottom short side, and the second low-frequency antenna is provided close to a top short side and in a target clearance area of the mobile terminal, the target clearance area comprising an overlapping area between a long-side antenna clearance area and a short-side antenna clearance area of the mobile terminal.

19. The tablet personal computer of claim 18, further comprising:

a screen component comprising a cover plate, and a support body provided between the cover plate and the housing, for carrying and assembling the screen component;

wherein the first low-frequency antenna is the cavity antenna, and a radiator of the second low-frequency antenna is provided on a connection surface between the cover plate and the support body.

20. The tablet personal computer of claim 18, wherein the antenna system further comprises: a medium-high frequency antenna group comprising at least two medium-high frequency antennas, wherein one medium-high frequency antenna of the at least two medium-high frequency antennas is provided close to a long side of the housing, and an other medium-high frequency antenna is provided close to a short side of the housing, and an operating frequency band of the medium-high frequency antenna comprises at least one of a MHB frequency band or a N41 frequency band, and at least one of the at least two medium-high frequency antennas is a cavity antenna;

or, the antenna system further comprises: a high-frequency antenna group comprising at least two high-frequency antennas, wherein one high-frequency antenna of the at least two high-frequency antennas is provided close to a top short side of the housing, and an other high-frequency antenna is provided close to a long side of the housing, and an operating frequency band of the high-frequency antenna comprises at least a N78 frequency band, and at least one of the at least two high-frequency antennas is a cavity antenna;

or, the antenna system further comprises: a positioning antenna provided close to a top short side of the housing, an operating frequency band of the positioning antenna comprising a Global Positioning System (GPS) frequency band; and a Wi-Fi antenna group comprising at least two Wi-Fi antennas, wherein one Wi-Fi antenna of the at least two Wi-Fi antennas is provided close to a long side of the housing, and an other Wi-Fi antenna is provided in a camera module of the mobile terminal, wherein operating frequency bands of the at least two Wi-Fi antennas comprise at least one of a Wi-Fi 2.4G frequency band or a Wi-Fi 5G frequency band, wherein at least one of the positioning antenna and the at least two Wi-Fi antennas is a cavity antenna.

* * * * *